United States Patent
Xu et al.

(10) Patent No.: US 8,184,502 B2
(45) Date of Patent: May 22, 2012

(54) ROCK PHYSICS MODEL FOR SIMULATING SEISMIC RESPONSE IN LAYERED FRACTURED ROCKS

(75) Inventors: Shiyu Xu, Kingwood, TX (US); Ganglin Chen, Houston, TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 93 days.

(21) Appl. No.: 12/863,867

(22) PCT Filed: Jan. 26, 2009

(86) PCT No.: PCT/US2009/032007
§ 371 (c)(1),
(2), (4) Date: Jul. 21, 2010

(87) PCT Pub. No.: WO2009/108432
PCT Pub. Date: Sep. 3, 2009

(65) Prior Publication Data
US 2010/0312534 A1  Dec. 9, 2010

Related U.S. Application Data

(60) Provisional application No. 61/067,534, filed on Feb. 28, 2008.

(51) Int. Cl.
*G01V 1/00* (2006.01)
*G06F 7/60* (2006.01)
*G06F 17/10* (2006.01)

(52) U.S. Cl. .................. 367/38; 367/73; 703/2; 703/10; 703/5; 703/7

(58) Field of Classification Search ............... 73/152.05; 367/25, 31, 38, 73; 702/6–7, 11–14, 16, 702/18; 703/2, 5, 10
See application file for complete search history.

(56) References Cited

U.S. PATENT DOCUMENTS
4,375,090 A   2/1983  Thompson et al.
(Continued)

FOREIGN PATENT DOCUMENTS
WO  WO 2006/062612   6/2006
(Continued)

OTHER PUBLICATIONS

Rathore, J. et al. (1994), "P- and S-wave anisotropy of a synthetic sandstone with controlled crack geometry," *Geophysical Prospecting* 43, pp. 711-728.

(Continued)

*Primary Examiner* — Mark Hellner
*Assistant Examiner* — Daniel L Murphy
(74) *Attorney, Agent, or Firm* — ExxonMobil Upstream Research Co. Law Dept

(57) ABSTRACT

Method for modeling anisotropic elastic properties of a subsurface region comprising mixed fractured rocks and other geological bodies. P-wave and fast and slow S-wave logs are obtained, and an anisotropic rock physics model of the subsurface region is developed (21). P- and fast and slow S-wave logs at the well direction are calculated using a rock physics model capable of handling fractures and other geological factors (22). Calculated values are compared to measured values in an iterative model updating process (23). An upscaled ID model is developed by averaging elastic properties in each layer using an upscaling theory capable of handling at least orthorhombic anisotropy (24). The ID model may be used to generate synthetic seismic response for well ties or AVO modeling (25). Further, a method is disclosed for estimating anisotropy parameters from P- and fast/slow S-wave logs from one or more deviated wells.

26 Claims, 9 Drawing Sheets

U.S. PATENT DOCUMENTS

| | | | |
|---|---|---|---|
| 5,659,135 | A | 8/1997 | Cacas |
| 5,675,147 | A | 10/1997 | Ekstrom et al. |
| 5,828,981 | A | 10/1998 | Callender et al. |
| 5,869,755 | A | 2/1999 | Ramamoorthy et al. |
| 6,088,656 | A | 7/2000 | Ramakrishnan et al. |
| 6,529,833 | B2 | 3/2003 | Fanini et al. |
| 6,714,480 | B2 | 3/2004 | Sinha et al. |
| 6,795,773 | B2 | 9/2004 | Soliman et al. |
| 6,901,333 | B2 | 5/2005 | Van Riel et al. |
| 6,904,365 | B2 | 6/2005 | Bratton et al. |
| 6,917,564 | B2 | 7/2005 | Leaney |
| 6,925,031 | B2 | 8/2005 | Kriegshauser et al. |
| 6,959,246 | B2 | 10/2005 | Herron |
| 6,970,397 | B2 | 11/2005 | Castagna et al. |
| 6,987,385 | B2 | 1/2006 | Akkurt et al. |
| 7,035,165 | B2 | 4/2006 | Tang |
| 7,042,802 | B2 | 5/2006 | Sinha |
| 7,111,681 | B2 | 9/2006 | Detournay et al. |
| 7,149,671 | B2 | 12/2006 | Lim et al. |
| 7,377,318 | B2 | 5/2008 | Detournay et al. |
| 2002/0120429 | A1 | 8/2002 | Ortoleva |
| 2003/0028325 | A1* | 2/2003 | Roggero et al. ............... 702/11 |
| 2006/0074561 | A1 | 4/2006 | Xia et al. |
| 2006/0153005 | A1 | 7/2006 | Herwanger et al. |
| 2006/0212225 | A1 | 9/2006 | Bachrach et al. |
| 2006/0219402 | A1 | 10/2006 | Lecampion |
| 2007/0097787 | A1 | 5/2007 | Moos |
| 2008/0020229 | A1 | 1/2008 | Taya et al. |

FOREIGN PATENT DOCUMENTS

WO     WO 2006062612 A2 *   6/2006

OTHER PUBLICATIONS

Backus, G. E. (1962), "Long-wave elastic anisotropy produced by horizontal layering," *Journal of Geophysical Research* 67, pp. 4427-4440.

Batzle, M. et al. (1992), "Seismic properties of pore fluids", *Geophysics* 57, pp. 1396-1408.

Bayuk, I.O. et al. (2008), Upscaling of elastic properties of anisotropic sedimentary rocks, *Geophysical Journal Int'l.* 172, pp. 842-860.

Berryman, J. G., "Long-wave elastic anisotropy in transversely isotropic media", *Geophysics* 44, pp. 896-917, 1979.

Brown, R.J.S. et al. (1975), "On the dependence of the elastic properties of a porous rock on the compressibility of the pore fluid," *Geophysics* 40, pp. 608-616.

Eshelby, "Class Reference", *Material Object Libraries*, 2 pgs, 2008.

Eshelby, J.D. (1957), "The determination of the elastic field of an ellipsoidal inclusion, and related problems," *Proceedings of Royal Society of London, Series A*, 241, pp. 376-396.

Hornby, B.E., et al. (1994), "Anisotropic effective-medium modeling of the elastic properties of shales," *Geophysics* 59, pp. 1570-1583.

Hornby, B.E. et al. (2003), "Anisotropy correction for deviated-well sonic logs: Application to seismic well tie", *Geophysics* 68, pp. 464-471.

Hudson, J.A. (1981), "Wave speeds and attenuation of elastic waves in material containing cracks", *Geophysical J. of the Royal Astronomical Society* 64, pp. 133-150.

Keys, R.G. et al. (2002), "An approximation for the Xu-White velocity model," *Geophysics* 67, pp. 1406-1414.

Mura, T. (1987), *Micromechanics of defects in solids*, Martinus Nijhoff Publishers, Dordrecht, pp. 137-140.

Nishizawa, O. (1982), "Seismic velocity anisotropy in a medium containing oriented cracks- Transversely isotropic case," *Journal of Physical Earth* 30, pp. 331-347, 1979.

Schoenberg, M., et al. (1989), "A calculus for finely layered anisotropic media," *Geophysics* 54, pp. pp. 581-589.

Thomsen, L. (1995), "Elastic anisotropy due to aligned cracks on porous rock," *Geophysical Prospecting* 43, pp. 805-829.

Thomsen, L. (1986), "Weak elastic anisotropy", *Geophysics*, 51, pp. 1954-1966.

Tsuneyama, F. et al. (2005), "Velocity anisotropy estimation for brine-saturated sandstone and shale", *The Leading Edge* 24, pp. 882-888.

Tuncay, K. et al. (1996), "Consolidation of Elastic Porous Media Saturated by Two Immiscible Fluids", *J. of Engineering Mechanics*, pp. 1077-1085.

Tuncay, K. et al. (1996), "Wave Propagation in Fractured Porous Media", *Transport in Porous Media* 23, pp. 237-258.

Tuncay, K. et al. (1996), "Body Waves in Fractured Porous Media Saturated by Two Immiscible Newtonian Fluids", *Transport in Porous Media* 23, pp. 259-273.

Xu, S. et al. 91995),"A new velocity model for clay-sand mixtures," *Geophysical Prospecting* 43, pp. 91-118, 1995.

Xu, S. (1996), "A physical model for shear-wave velocity prediction," *Geophysical Prospecting* 44, pp. 687-717.

Xu, S., (1998) "Modeling the effect of fluid communication on velocities in anisotropic, porous rocks," *Int. J. Solids Struct.* 35, pp. 4685-4707.

Xu, S. (2002), "Stress-induced anisotropy in unconsolidated sands and its effect on AVO analysis," *72nd Annual International Meeting, SEG, Expanded Abstracts*, pp. 105-108.

International Search Report and Written Opinion, dated Apr. 9, 2009, PCT/US2009/032007.

* cited by examiner

ROCK PHYSICS MODEL FOR SIMULATING SEISMIC RESPONSE IN LAYERED FRACTURED ROCKS

CROSS-REFERENCE TO RELATED APPLICATION

This application is the National Stage of International Application No. PCT/US2009/032007, which published as WO 2009/108432, filed 1 Jan. 2009, which claims the benefit of U.S. Provisional Application No. 61/067,534, filed 28 Feb. 2008, each of which is incorporated herein by reference, in its entirety, for all purposes.

BACKGROUND OF THE INVENTION

1. Field of the Invention

This invention relates generally to the field of petroleum reservoir management or other fields where movement of pore fluids through fractured rock is important, and more particularly to seismic fracture characterization methods. Specifically, the invention is a method for developing a rock physics model for layered fractured rocks to use in simulating seismic response.

2. Background of the Invention

Fractures may serve as major conduits for movement of pore fluids (hydrocarbons or water) and dissolved chemicals through low porosity, low permeability reservoir or non-reservoir rocks. Understanding fluid flow and mass transport in fractured rocks is essential for optimal reservoir management as well as other applications such as assessing the groundwater resources of hard-rock aquifers, investigating the suitability of underground sites for hazardous waste disposal, and predicting the movement of hazardous chemicals if contamination occurs. A key strategy for fractured reservoir management is a quantitative description of the geology, geophysics and petrophysical attributes.

Numerous laboratory and field studies indicate that aligned fractures will cause the anisotropic behavior of rock properties (such as wave velocities, attenuation, resistivity, thermal conductivity and permeability). Different fracture configurations/alignments will have different types of anisotropy. For example, a resulting effective medium of an isotropic rock matrix permeated with a single set of aligned fractures will be transversely isotropic (TI). Similarly, two or three orthogonally-intersected fracture sets will give an orthorhombic system. In more general case where two or more fracture sets intercept at arbitrary angles, one has a monoclinic system.

Quantifying fracture anisotropy with surface seismic data should provide an optimal strategy for fractured reservoir management by integrating the geophysical data from all scales with the engineering data. P-wave AVO/AVA and azimuthal velocity anisotropy analyses can be important for inferring fracture properties. In addition to these analyses, S-wave splitting (birefringence) of either pure S waves or converted PS waves can be analyzed to characterize special fracture distributions.

Rock physics modeling plays a key role in these seismic fracture characterization methods. Existing theories and workflows for modeling anisotropic elastic properties of a fractured rock are often of limited usefulness. For example, many widely-used fracture models (e.g. Hudson 1981) are valid only when fracture porosity is much smaller than the mean fracture aspect ratio. This is called the dilute pore concentration assumption and models with this limitation are hardly useful in real applications. Effective medium theories, such as differential effective medium theory ("DEM") or self-consistent ("SC") theory successfully overcome this limitation (e.g. Hornby et al. 1994).

However, inclusion-based effectively medium theories (e.g. DEM and SC) have their own problems. First, one key assumption in these models is that all pores or fractures are isolated, which does not allow the fluid communication between fractures and matrix pores. This will give a high-frequency response in terms of fluid flow mechanisms. Therefore these models are not suitable to simulate low-frequency seismic responses. Theoretical studies (e.g. Thomsen 1995, Xu 1998) and laboratory experiments (e.g. Rathore et al. 1995) show that fluid communication can have a significant effect on the resulting seismic anisotropy. It is very important to correctly handle fluid communication to simulate seismic anisotropy. One solution to the problem is to first calculate dry rock frame properties using the inclusion-based models and then to introduce the pore fluid into the system using Gassmann's theory (e.g. Xu and White, 1995). This gives the low-frequency response since Gassmann's theory assumes a totally connected pore system.

Another drawback with the DEM or SC theory is that they are computationally extremely expensive. In some cases, it becomes impractical to apply their anisotropic versions, for example, to well log analysis. Keys and Xu (2002) proposed a dry rock approximation method, which dramatically speeds up the numerical calculation of the differential effective medium method while maintaining its accuracy. Xu, Saltzer and Keys (PCT Patent Application Publication WO/2006/062612) extended the dry rock approximation to the anisotropic case. Above all, all the fracture models mentioned above are designed to estimate elastic properties of fractured rocks only. They are unable to handle rock columns with mixed anisotropy types (e.g. shale anisotropy and layering anisotropy mixed with fracture anisotropy). In real cases, a fractured rock layer often has limited thickness and coexists with other rock types, such as shale (FIG. 1). At a typical seismic frequency, say 30 Hz, the wavelength can be as large as 100 meters. If the overall thickness of the mixed rock column is less than, for example, half of the wavelength, it is not possible to separate the fracture anisotropy from shale anisotropy and layering anisotropy. In practical applications, therefore, it is critical to have a rock physics model that can consistently consider various types of geological factors including, but not limited to, porosity, shale volume, fluid content, lithology, pore type and fractures when modeling seismic response.

Furthermore, to improve the seismic modeling efficiency, a plurality of logs sampled at a constant sampling interval such as 0.5 foot are often blocked into a limited number of layers in a consistent manner using a theoretical model. This is called seismic upscaling. Backus averaging (1962) is able to handle individual layers with anisotropy up to transversely isotropic with a vertical symmetry axis ("VTI"). The resulting effective medium always exhibits a VTI symmetry. The Backus method has been widely used in a sand-shale system. However, the method is unable to handle a geological system with types of anisotropy other than VTI. This is because in many geological conditions, fractures typically align vertically and, hence, give a HTI (transverse isotropy with a horizontal symmetry axis) for a single fracture set, or orthorhombic for two orthogonally-intersected fractures. In more general cases where two or more fracture sets intersect obliquely or a VTI medium (e.g. shale) having one set of non-vertical fractures, one has a monoclinic system. In short, a more sophisticated scheme is needed for upscaling elastic properties of a geological rock column with mixed fractured rocks and other geological bodies. The present invention satisfies this need.

SUMMARY OF THE INVENTION

In one embodiment, the invention is a method for modeling anisotropic elastic properties of a subsurface region comprising mixed fractured rocks and other geological bodies, in order to predict fluid flow or mass transport or for seismic interpretation in the subsurface region, comprising:

(a) developing an anisotropic rock physics model for the subsurface region, wherein the model simulates seismic anisotropy via preferred orientations of clay-related pores, fracture anisotropy via alignment of fractures, and stress-induced anisotropy via preferred orientations of microcracks;

(b) calculating an elastic stiffness/compliance tensor, comprising at least three anisotropy parameters, at selected discrete depth intervals using the anisotropic rock physics model;

(c) generating a one-dimensional layered earth model, said 1D earth model being of a coarse scale suitable for simulating elastic and transport properties;

(d) averaging the elastic stiffness/compliance tensor within each layer of the 1D layered earth model using an upscaling theory able to treat at least orthorhombic anisotropy, thereby generating an upscaled anisotropic 1D model of elastic properties of the subsurface region;

(e) generating synthetic seismic response from the subsurface region using the upscaled anisotropic 1D model; and (f) using the synthetic seismic response for seismic interpretation or prediction of fluid flow or mass transport in the subsurface region.

In some embodiments of the invention, the upscaled anisotropic 1D model is calibrated before generating the synthetic seismic response. The calibration is preferably performed using a calibration method capable of handling general anisotropy.

In some embodiments of the invention, the inventive method further comprises:

obtaining P-wave logs and fast and slow S-wave logs measured in a well bore in the subsurface region;

(ii) calculating P-wave logs and fast and slow S-wave logs traveling in a direction along the well bore from the elastic stiffness/compliance tensor;

(iii) comparing the calculated and measured P-wave logs and fast and slow S-wave logs; and (iv) if the comparison is not within a pre-selected tolerance, adjusting input parameters to the anisotropic rock physics model resulting in a revised anisotropic rock physics model and re-calculating the elastic stiffness/compliance tensor from the revised anisotropic rock physics model, then repeating steps (ii)-(iv) until the tolerance is met or other stopping condition is reached.

In some embodiments of the invention, the anisotropy parameters are calculated by steps comprising:

(a) obtaining P-wave and cross-dipole (fast and slow) S-wave well log data from a single deviated well in the subsurface region;

(b) calculating elastic constants for the subsurface region using an anisotropic rock physics model and quantities estimated from the well log data;

(c) estimating three anisotropy parameters from the elastic constants; and (d) optimizing the three anisotropy parameters by minimizing errors between calculated and measured values of P-wave and cross-dipole (fast and slow) S-wave logs, said calculated P-wave and cross-dipole (fast and slow) S-wave logs being calculated using the elastic constants, which are then modified in performing the optimizing.

This physics-based method for calculating the anisotropy parameters may be used for any purpose in which anisotropy parameters are needed and deviated well data are available, and the method is particularly advantageous where data are available from only a single deviated well.

BRIEF DESCRIPTION OF THE DRAWINGS

The patent or application file contains at least one drawing executed in color. Copies of this patent or patent application publication with color drawings will be provided by the Office upon request and payment of the necessary fee.

The present invention and its advantages will be better understood by referring to the following detailed description and the attached drawings in which.

The invention will be described in connection with its preferred embodiments. However, to the extent that the following detailed description is specific to a particular embodiment or a particular use of the invention, this is intended to be illustrative only, and is not to be construed as limiting the scope of the invention. On the contrary, it is intended to cover all alternatives, modifications and equivalents that may be included within the scope of the invention, as defined by the appended claims.

DETAILED DESCRIPTION OF EXAMPLE EMBODIMENTS

Figure 1:
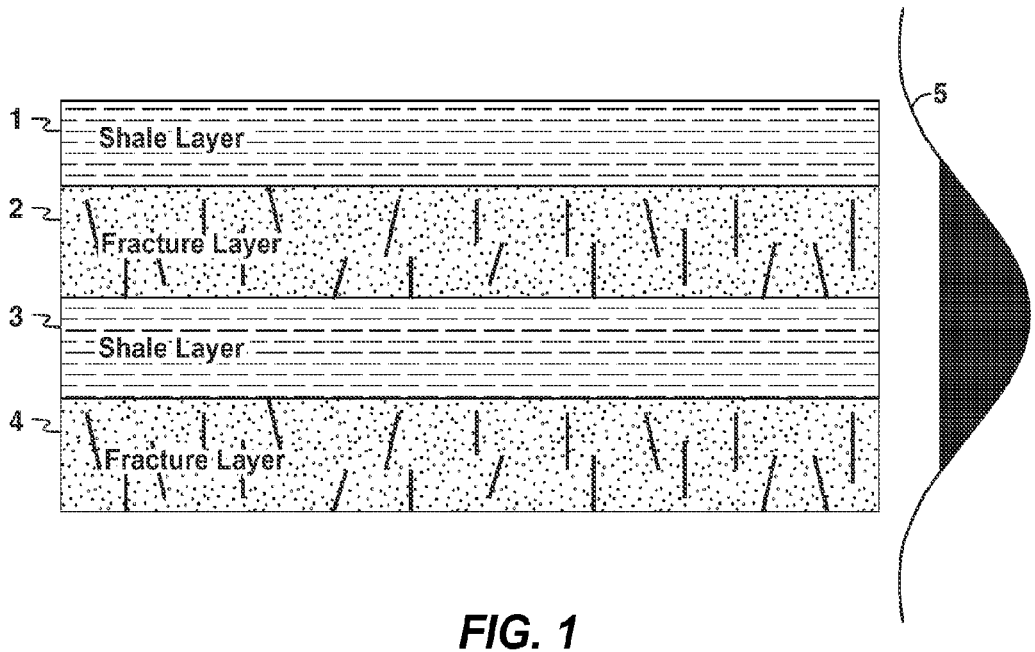
FIG. 1 illustrates a multi-layer system in which fracture layers coexist with non-fracture layers, but the two types of layers have very different anisotropy symmetry.
Figure 2:
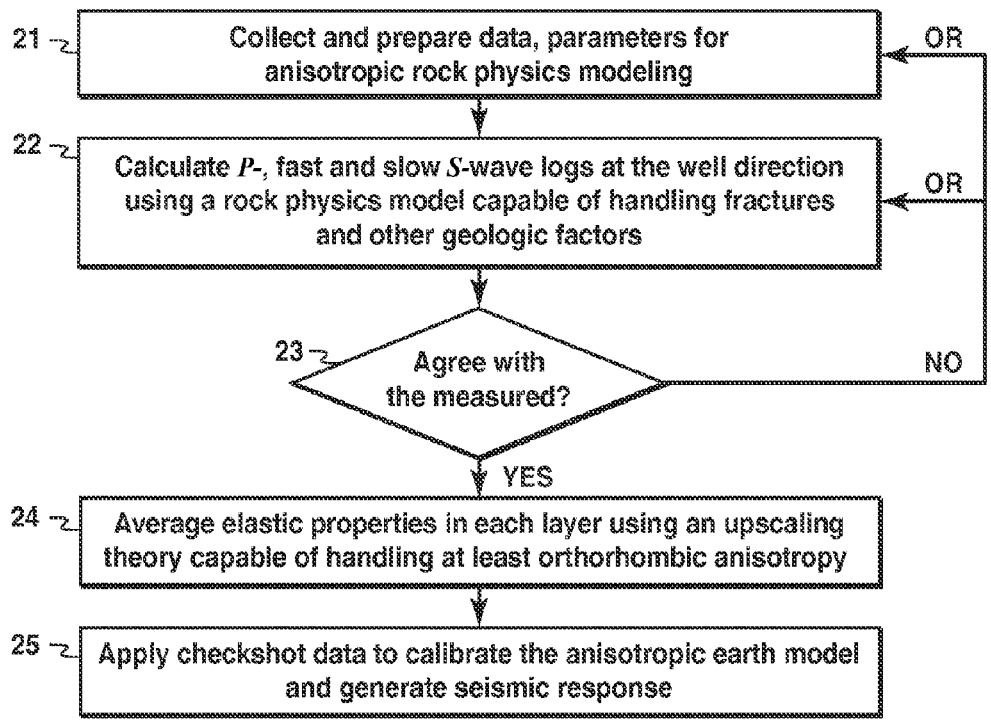
FIG. 2 is a flow chart showing basic steps in one embodiment of the present inventive method.

The present invention is a method for seismic modeling in a mixed geological environment where fractured layers are inter-bedded with non-fractured layers, an example of which is illustrated in FIG. 1. Layers 1 and 3 are shale, and 2 and 4 are fracture layers. The anisotropy symmetry in the fractured layers (typically HTI for a single fracture set) can be significantly different from that in the non-fractured layers (typically VTI). The thinness of the layers is indicated by comparison to the approximate seismic wavelength as shown by wavelet 5. FIG. 2 is a flowchart showing basic steps in one embodiment of the present inventive method for accurate well/seismic tie and AVO (amplitude versus offset) modeling.

In step 21, parameters and data, which are necessary for anisotropy rock physics modeling, are collected and analyzed. This involves the following sub-steps, outlined in FIG. 3.

In step 31, deviation survey data and bedding dipping data, if available, are obtained for a subsurface region, and typically are loaded into a computer system. The data are needed to define the relative angle between the well trajectory and the normal to bedding. Bedding dipping data may be interpreted from seismic data or well log data. If deviation survey data and bedding dipping data are not available, assumptions may be made on the relative angle between the well trajectory and bedding normal; for example, a vertical well with horizontal bedding may be assumed.

In step 32, temperature and pressure profiles are constructed to consider their effects on fluid properties. The stress data are also useful for the analysis of stress-induced anisotropy, especially in young unconsolidated sands.

In step 33, a plurality of rock properties, e.g. porosity, clay content, mineralogy, permeability, and water saturation are estimated from a plurality of well logs such as gamma ray, density, neutron porosity, sonic, and various resistivity (deep, medium, shallow and micro) logs.

In step 34, fracture parameters such as fracture density and fracture orientation distribution are estimated from, for example, FMI (Formation Micro-Imager) and/or cross-dipole logs. The orientation distribution for clay-related pores may be estimated from high-resolution images, such as SEM (Scanning Electron Microscopy). Crack orientation distribution parameters may be calibrated using laboratory or/and well log data (Xu 2002).

In step 22, the elastic stiffness/compliance tensor at each depth is calculated using a rock physics model that is able to consistently handle different types of seismic anisotropy in geo-layers with or without fractures. Such a rock physics model will be described below. Results from steps 31-34 are used as input quantities in developing the rock physics model. P-wave logs, and fast and slow S-wave logs traveling in the direction along the wellbore are then calculated from the elastic stiffness/compliance tensor.

In step 23, the calculated P- and S-wave logs may then be compared with measured data, if available. If their agreement is not satisfactory, return to step 21 or 22 to reevaluate the input parameters to the rock physics model and repeat the calculation again. Otherwise, continue to step 24 below.

In step 24, anisotropic upscaling capable of handling different types of anisotropy (e.g. VTI, HTI and orthorhombic) is applied to the calculated well logs from step 22 or 23, sampled at original fine intervals, e.g. 0.5 ft., for efficient seismic modeling. Step 24 involves two sub-steps:

(a) generate a 1D layered earth model, typically by detecting boundaries of geological layers from one or more well logs (e.g. P-, S-wave and/or density logs); and (b) average the elastic stiffness tensor within each layer using an upscaling theory that is able handle anisotropy of the order of at least orthorhombic.

In step 25, checkshot data may be applied to calibrate the anisotropic earth model (the calibration step is recommended but not essential to the invention) and generate synthetic seismic response. One can choose either well/seismic tie(s) or AVO analysis, depending on the type of work:

(a) Generate (incidence) angle or full stack using a program that is able to handle general anisotropy (e.g. orthorhombic) and perform well/seismic ties. In case of isotropic synthetic trace generation, one may convert P- and S-wave logs from the directions along the deviated well to those at the vertical direction, based on the calculated anisotropy parameters and then generate synthetic traces using an isotropic reflectivity method.

(b) Generate synthetic CMP (common middle point) gathers using a program that is able to handle general anisotropy (e.g. orthorhombic) and perform AVO analyses.

Tying seismic data to well logs is one of the main hydrocarbon reservoir characterization work processes to evaluate the quality of the seismic data, the well log data, and the validity of the rock physics model. Seismic data are in some respects meaningless until tied to well logs, which link to the geology. Data interpreters, for example, need seismic/well tie(s) to define the top or base reservoir on seismic data. Quality of seismic data is evaluated using goodness in the match between synthetic seismic data and the actual (field) seismic data. AVO analysis is typically used for fluid prediction (e.g., oil or water) and lithology discrimination. Synthetic seismic gathers are typically compared with real seismic gathers to quantify the fluid effect or lithology effect. However, AVO is affected by other factors, anisotropy in particular. These factors need to be considered in order to interpret the observed AVO anomalies correctly.

Figure 4:
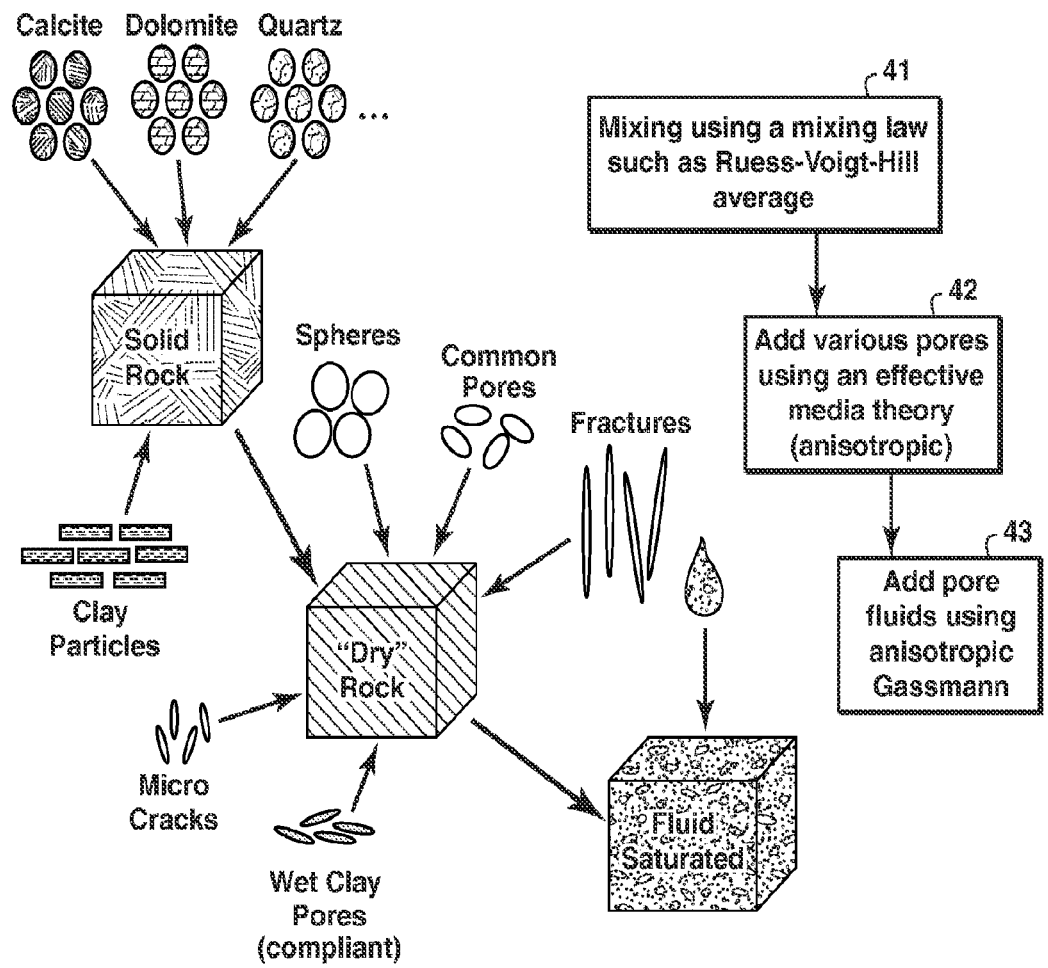
FIG. 4 is a schematic diagram illustrating construction of a rock physics model capable of treating fracture anisotropy, stress-induced anisotropy and shale anisotropy.
Figure 5:
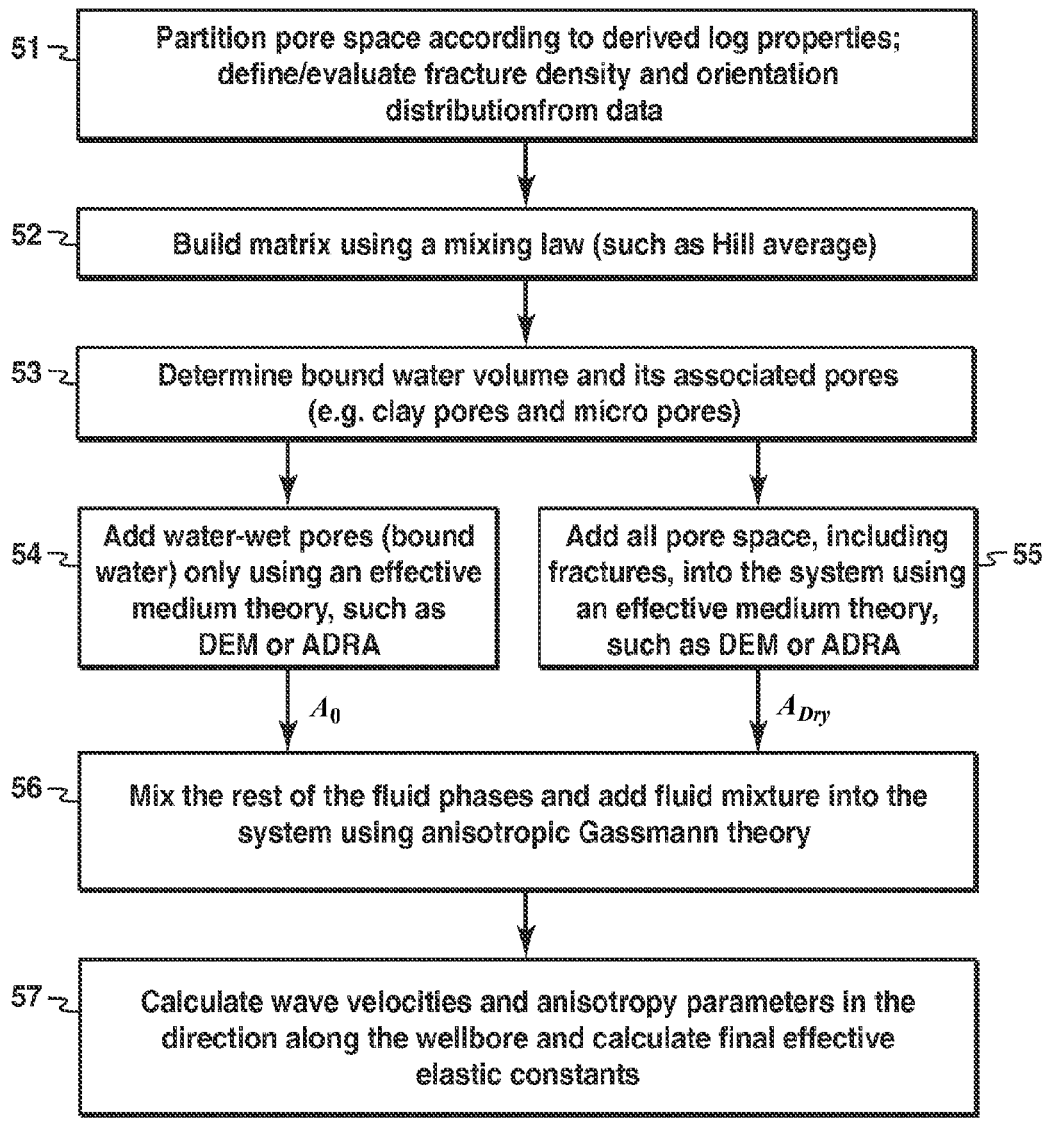
FIG. 5 is a flow chart showing basic steps in an embodiment for constructing a rock physics model corresponding to the schematic diagram of FIG. 4.

A rock physics model that is able to consistently handle different types of seismic anisotropy in geo-layers with or without fractures is described next; i.e. what follows is a description of a preferred way to perform step 22 of FIG. 2. FIG. 4 is a schematic diagram showing how the model works in practice. At step 41, the sand grains are mixed with clay particles using a mixing law (e.g. the Voigt-Reuss-Hill average). At step 42, the various pores are added using an anisotropic effective medium theory. The clay pores are added to the system using the differential effective medium ("DEM") scheme or the anisotropic dry rock approximation ("ADRA") scheme, which will be described later, to consider the mechanical interaction between the pores. When adding clay-related pores and other types of micro pores, it is assumed that they are always water-wet due to the capillary effect (PCT Patent Application Publication WO/2006/062612). The macro pores (such as inter-particle, equant pores and fractures) are added to the system in a similar manner, except that there is no fluid in those pores to be added to the system at this point. At step 43, hydrocarbons are mixed with brine/water using a mixing law, such as the Wood's Suspension Model. The anisotropic version of the Gassmann model (Brown and Korringa, 1975) may be used to put the fluid mixture in macro pores (including fractures) into the system. The result of step 43 is elastic constants for the region of interest that are generated with consideration of not only stress-induced anisotropy and shale anisotropy but also fracture anisotropy. Finally (not shown in FIG. 4), P-, and S-wave velocities and Thomsen parameters can be calculated from the effective elastic constants obtained using the above procedures. Development of the model in one embodiment of the invention is described in more detail next, with reference to the flow chart of FIG. 5 (FIG. 4 reference numbers shown in parentheses where applicable).

Figure 3:
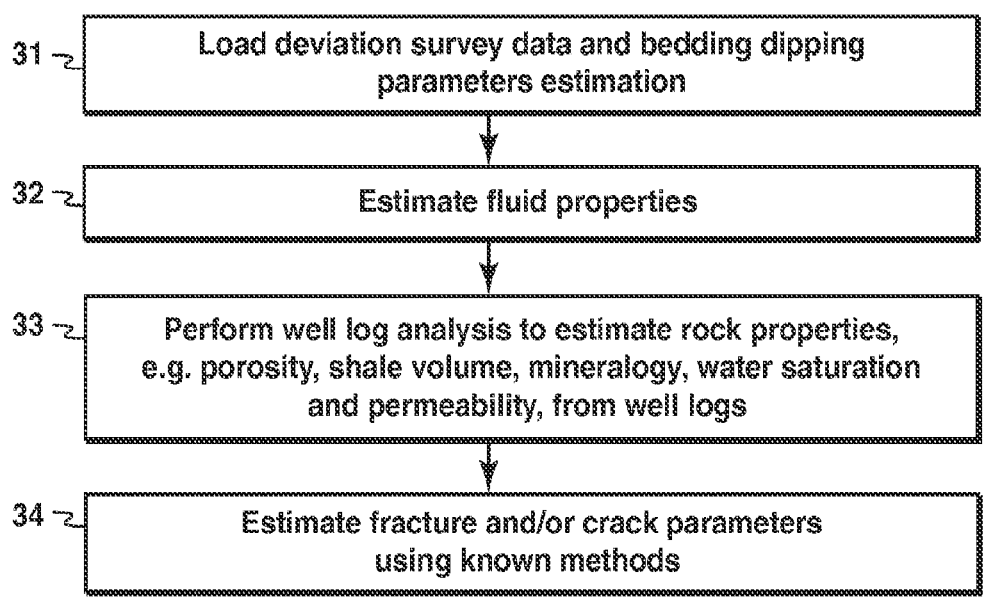
FIG. 3 illustrates data preparation and parameter estimation for anisotropic rock physics modeling.

Step 51: define pore types and partition pore space based on porosity, shale volume, stress and fracture data evaluated in steps 33 and 34 of FIG. 3. As a specific example, assume that the pore system has five pore types: inter-particle, equant, clay pores, microcracks, and fractures. Treating more than five pore types is straightforward. Then, different minerals are mixed using a mixing law based on the mineralogy data evaluated in step 33 of FIG. 3.

Step 52 (41): to consider the mineralogy effect, a mixing law, such as the Hill Average, is used to average the bulk and shear moduli of the constituent minerals, e.g. quartz, calcite, dolomite and clay particles.

Step 53 (42): define which pores are communicating and which pores are effectively isolated according their pore sizes (local permeability) to consider the effect of fluid movement on P- and S-wave velocities at the pore scale. In general, clay pores and micro cracks which are smaller than, say, 1μ are practically isolated and always occupied by bound water.

Step 54 (42): add water-wet micro pores (microcracks and clay pores) into the system using a theory (e.g. DEM or ADRA). This will give the effective compliance tensor of the composite with water-wet micro pores only. The effective compliance tensor is needed for anisotropic Gassmann fluid substitution later.

Step 55 (42): add all pores (micro cracks, clay pores, inter-particle, equant pores and fractures) into the system using a theory. Similarly, micro pores (e.g. clay pores and microcracks) are treated in the same way as described in step 42(a). These micro pores with fluid added at this point will give a high-frequency seismic response since the fluid contained in these pores is not allowed to communicate with fluids in other pores. Macro pores (inter-particle, equant pores and fractures) are added into the system without fluid at this point. This will give the effective compliance tensor of the "dry" rock.

Step 56 (43): determine and mix the rest of the fluids using a fluid mixing law.

Step 57 (43): put the mixed fluid into the pores without fluid using an anisotropic Gassmann fluid substitution method (Brown and Korringa 1977). This will give the final effective stiffness/compliance tensor of the saturated rock.

Next, an integrated method to predict anisotropy parameters from limited log data (one P-wave log and two S-wave logs) from as few as one deviated (i.e., non-vertical) well is disclosed. A deviated well means a non-vertical well, but the method described next also works when the well is vertical but the layers in the earth are dipping. The term deviated well will be understood herein, including the claims, to include both situations. The following method is advantageous either as a stand-alone method for any application in which anisotropy parameters are needed or as part of the process for updating the rock physics model in step 23 of FIG. 2 when deviated well data are available. The method is physics-based rather than empirical.

There have been some published attempts to estimate the anisotropy parameters from very limited logging data, especially at deviated wells. Hornby et al. (2003) observed significantly faster sonic P-wave velocities in deviated wells penetrating shales in the Niakuk field in Alaska's North Slope than in vertical wells. These differences were interpreted to be a result of shale anisotropy. The authors proposed an iterative inversion scheme to invert shale anisotropy parameters using sonic data from multiple deviated wells penetrating the same shale sections at different angles. Their inversion method involves fitting the sonic log data at a range of borehole deviation angles to the compressional-wave group velocity surface. The result is an estimate of the anisotropy parameters ($\epsilon$ and $\delta$) defined by Thomsen (1986) and the vertical P-wave velocity. The authors also proposed a procedure to estimate the anisotropy-corrected vertical sonic logs from sonic data recorded in a deviated well. The inputs are well deviation, P-wave sonic log, volume of shale or gamma ray data, and anisotropy parameters for rock with 100% shale volume. With these inputs the compressional-wave group velocity surface is computed and the equivalent vertical P-wave sonic log is output. The equivalent vertical sonic log was used for standard seismic applications using isotropic velocity assumptions.

Hornby's proposed method requires a significant number of wells with different deviation angles in order to estimate the anisotropy parameters reliably. Another key assumption in the method is that rock properties for a given formation remain the same at different well locations. In many realistic geological conditions, this assumption may be easily violated to different degrees. This creates a serious concern about this inversion method.

Tsuneyama and Mavko (2005) recently concluded that there is no reliable method for an anisotropy correction when only standard log data from a single well are available. The authors compiled experimental data of core velocity anisotropy from several recent publications to explore heuristic relationships between anisotropy parameters and general well log information and found a clear trend of velocity anisotropy in the crossplot domain between velocity and porosity. Subsequently, they developed a method to estimate Thomsen's anisotropy parameters, epsilon and gamma, by a regression in this domain. This empirical method relies on laboratory measurements, which might be different from true seismic anisotropy because of the frequency effect. Secondly, there is a concern about how representative the selected core samples are.

In summary, empirical approaches may be used to establish a relationship between anisotropy and rock properties (e.g. Hornby et al. 2003, Tsuneyama and Mavko 2005). However, these methods require large amount of laboratory testing or well logs at multi-deviated wells with different deviation angles to establish the relationship. In many cases, these methods attempt to estimate one or two anisotropy parameters ($\epsilon$ and $\delta$). There is a concern how to maintain the consistency between the estimated anisotropy parameters if more than one is estimated. Furthermore, it is nearly impossible to establish relationships between anisotropy and other parameters such as fluid properties.

Figure 6:
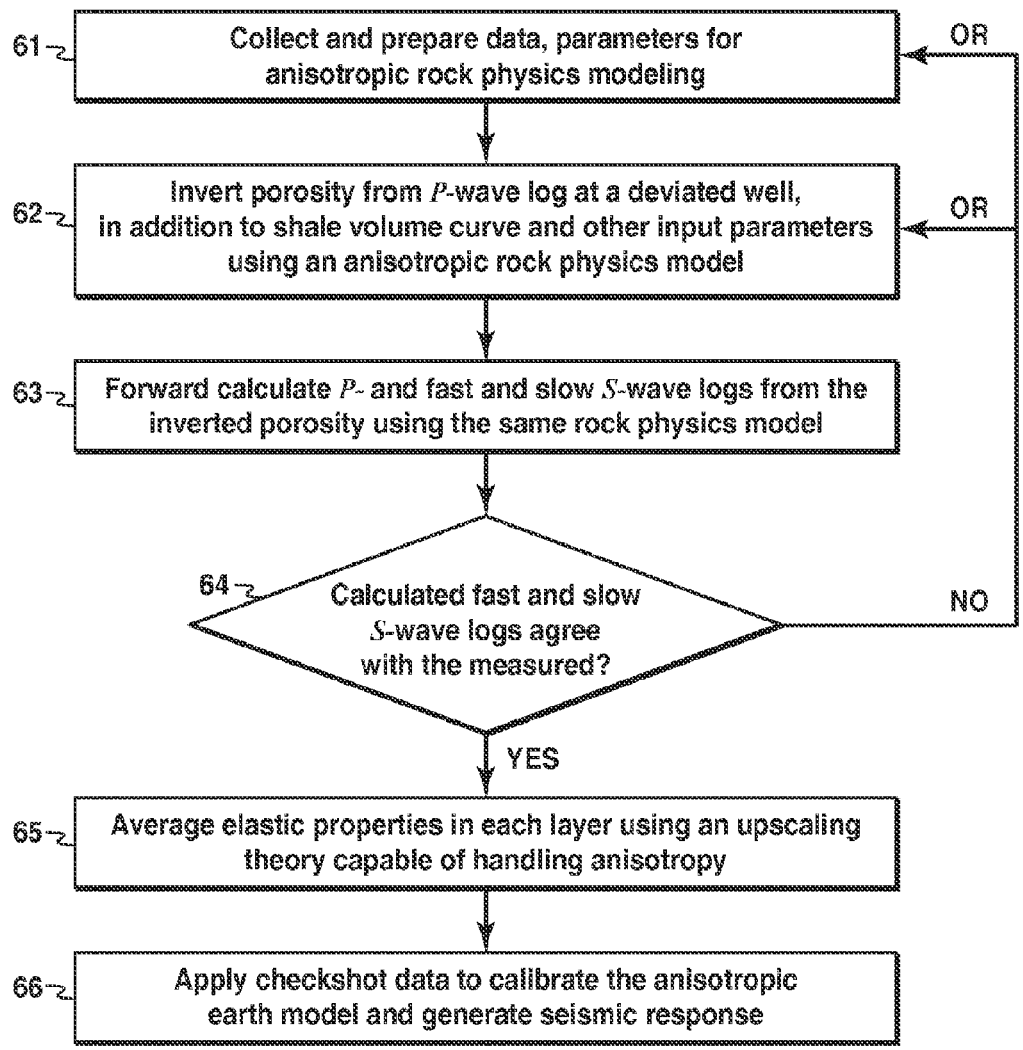
FIG. 6 is a workflow for anisotropy parameter estimation from limited well logs at deviated wells and seismic modeling.

A model-based (rather than empirical) method is disclosed herein that is highly constrained by rock physics principles. The estimated anisotropy parameters may then be validated using cross-dipole logs, by comparing the observed fast and slow shear-wave logs (hence the shear-wave splitting) at the well and that calculated from the model. The method is very flexible and can be applied to a single or multi-deviated well as long as cross-dipole logs are available. In the case of transverse isotropy, the Thomsen parameters ($\epsilon$, $\delta$ and $\gamma$) calculated using this method are internally consistent because they are calculated using the same method and same parameters (i.e. input data). Furthermore, this approach also handles consistently the effect of other rock or fluid parameters (e.g. fluid content) on anisotropy. The anisotropy parameters generated by this approach enable correct modeling of seismic response at deviated wells to improve seismic/well ties and AVO interpretation. The approach may be described in terms of the six steps shown in FIG. 6.

In step 61, collect and analyze parameters and data for an anisotropic rock physics model. This step is very similar to step 31 of FIG. 3, except this method is applicable to rocks with or without fractures. Therefore, fracture data may or may not be required depending on the technical issue to be addressed.

In step 62, invert porosity from a P-wave log from a deviated well where cross dipole logs are available, using an anisotropic rock physics model with the shale volume curve and other parameters as input quantities to the model. Similarly, one can invert other parameters (e.g. aspect ratios) if reliable porosity and shale volume curves are available.

In step 63, calculate full elastic constants from which Thomsen's (1986) anisotropy parameters ($\epsilon$, $\gamma$ and $\delta$) are then derived, the elastic constants being calculated from the input parameters using an anisotropic rock physics model (e.g. Xu et al. 2006). P-wave, cross-dipole (fast and slow) S-wave and density logs along the wellbore are calculated from the elastic tensors.

In step 64, compare measured cross-dipole (fast and slow) S-wave logs with the calculated to quantify the accuracy of the calculated anisotropy parameters. If the calculated results are not satisfactory, change one or more of the input parameters (e.g. pore aspect ratios and pore orientation distribution) and go back to steps 61 or 62 to repeat the workflow to recalculate the anisotropy parameters. This process is repeated until the calculated P-wave, fast and slow S-wave logs satisfactorily fit the measured. Step 64 is a significant step for the anisotropy parameter calibration using measured P-wave, fast and slow S-wave logs. This is because shear-wave splitting (the difference between SH-wave and SV-wave logs) is determined by the anisotropy parameters. Therefore, the goodness of fit between the calculated shear-wave splitting and that derived from the fast and slow S-wave logs indicates the accuracy of the calculated anisotropy parameters. In addition, a working interval and starting depth may be selected in step 62, and after step 64 but before step 65, the process may return to step 62 to repeat for a next depth interval, and so on. This depth loop is not shown in FIG. 6.

In step 65, apply an appropriate upscaling method to block the P-wave, S-wave, density and the calculated anisotropy parameter logs consistently. This step is very similar to step 24 except that fractures are optional here. For example, the Backus Averaging (Backus 1962) upscaling may be used if all the layers are transversely isotropic with a vertical symmetry axis (VTI) or isotropic (no fractures). In the case of general anisotropy (e.g. layered shale plus fractured sandstone), the method given by Schoenberg and Muir, (1989) will give good results.

In step 66, checkshot data may be used to calibrate the anisotropic earth model and generate synthetic seismic response. Again, this step is very similar to step 25, except the earth model can be VTI only, or mixed VTI with HTI or orthorhombic.

Next, certain features of example embodiments of the invention are disclosed in more detail.

In practical applications, one often encounters a mixed environment with fractured rocks inter-bedded with other lithology types, such as shale. The rock physics model of the present invention can predict seismic anisotropy of such a mixed system. The model is flexible enough to handle more general types of anisotropy (e.g. orthorhombic or monoclinic). The model is based on, but is developed beyond, the anisotropic dry rock approximation proposed by Xu, Saltzer and Keys (2006). It is, therefore, accurate and efficient.

To correctly simulate anisotropic seismic response from a layered system with mixed rock types with or without fractures, the present invention provides (1) a five-component rock physics model which is able to consistently predict elastic properties of different rock types with or without fractures, (2) a workflow to consistently evaluate parameters for such a model and correctly handle the layering effect (upscaling), and (3) a consistent method for checkshot calibration for rocks with arbitrary anisotropy.

Pore Partitioning

A mixed geological environment with fractured rock layers coexisting with non-fractured rock types such as shale is assumed. One critical part of the present invention is the definition of the pore system. The invention uses effective medium theory and idealizes pores as ellipsoids. The pore shape is therefore characterized by the aspect ratio (short axis/long axis) of the ellipsoid. With the use of effective medium theory, there is no limitation on the number of pore types (shapes) in our method. As a specific example, consider a five-component pore system consisting of clay pores ($\phi_{Clay}$), microcracks ($\phi_{MC}$), equant pores ($\phi_{Equant}$), inter-particle pores ($\phi_{IP}$) and, of course, fractures ($\phi_{Fracture}$).

$$\phi_T = \phi_{Clay} + \phi_{IP} + \phi_{MC} + \phi_{Equant} + \phi_{Fracture} \quad (1)$$

The present invention is not limited to the five pore types mentioned above. The rock physics model is able to handle a pore system with more than five pore types. How many pore types are used in the model primarily depends on the objectives of the work and the type of data. Also, not all the pore types may exist in a single rock type. For example, equant pores are frequently referred to as the modic or vuggy pores in carbonate rocks. In a clastic shaly-sand system, $\phi_{Equant}$ may be set to zero. Each pore type can be characterized using some statistical parameters, such as pore orientation, pore size and pore shape (aspect ratio) and/or their distributions.

Hornby et al. (1994) showed that the orientation distribution for clay pores can be described using a Gaussian distribution with two parameters: its mean and standard deviation. In the present invention's model, the coordinate typically is chosen so that the mean for clay pores is always zero. In this case it becomes a Normal distribution. The pore space is partitioned into the clay- and sand related pores using the scheme proposed by Xu and White (1995)

$$\phi_{Clay} = V_{sh} \phi_T \quad (2)$$

where $V_{sh}$ is the shale volume normalized by grain matrix. In this sense, the anisotropy in shale is simulated via a preferred orientation distribution of the clay-related pores, which can be described by, for example, a Gaussian distribution.

As shown by Xu et al. (2006), the amount of microcracks is often related to the in-situ stress conditions. This is how stress-induced anisotropy may be simulated in clastic rocks, such as unconsolidated sandstones. In tectonically passive regions, stress conditions are dominated by compaction. In these cases, the two horizontal stresses are more or less equal and, again, a Gaussian distribution can be used to quantify crack orientation distribution. For a horizontally layered system, its mean is simply 90 degrees. Laboratory measurements demonstrate that crack porosity can be linked to the overburden stress using an empirical relation. Following Xu et al. (2006), the following equation may be used to link crack porosity to the differential stress.

$$\phi_{MC} = \phi_{Initial} e^{-\beta \sigma_e} \quad (3)$$

where $\phi_{Init}$ is the initial crack porosity at zero effective overburden stress ($\sigma_o$) and $\beta$ is the pressure gradient and $\sigma_e$ is the differential stress in vertical direction.

Elastic properties of carbonate rocks are affected not only by mechanical compaction, but also by digenesis during their geological history. The stress control on microcracks in carbonate rocks may be quite different from that in clastic rocks. Therefore, the determination of microcracks in carbonate rocks can be more complicated.

In theory, the model of the present invention can handle more than one fracture set. In this example, it is assumed that the fracture system has two orthogonally-intersected fracture sets. The coordinate system may be chosen so that one fracture set is aligned perpendicular to the x-axis and the other perpendicular to the y-axis. Fractures are seldom perfectly aligned in practice and assuming perfectly aligned fractures often causes an overestimate of fracture anisotropy. Hence, a Gaussian distribution is again used to describe fracture orientation distribution for each fracture set.

The determination of fracture density and its orientation distribution for each fracture set can be a complicated and problematic process. In most cases, these parameters are estimated from borehole imaging logs (e.g., FMI). Special attention must be paid to the different definitions of fracture density by geologists and the geophysicists. Therefore, fracture density estimated from FMI logs preferably are calibrated using cross-dipole logs or multi-component VSP (vertical seismic profiling) data, or multi-azimuth seismic data if available.

Equant pores may exist in some special rocks e.g. carbonates, volcanics. They typically represent modic or vuggy pores in carbonate rocks. Photographical data, such as, thin sections, 3D X-ray microtomography images, or SEM pictures, are needed to determine amount of equant pores in the system. The rest of porosity will be inter-granular pores, typically the most commonly seen pore type in sedimentary rocks. In this specific embodiment of the invention, both equant pores and inter-granular pores are assumed to be randomly orientation, giving isotropic seismic response.

In short, the model simulates seismic anisotropy via the preferred orientations of clay-related pores, fracture anisotropy via the alignment of fractures, and stress-induced anisotropy via the preferred orientation of microcracks, which is controlled by the differential stress.

Mixing Mineralogy

To consider the mineralogy effect, different minerals (lithologies) can be mixed using a mixing law, e.g. the Hill Average. If it is assumed that the composite material consists of N types of different minerals, the Hill Average can be written as, $$C_M = \left( \sum_{i=1}^{N} v_i C_i + \frac{1}{\sum_{i=1}^{N} v_i \frac{1}{C_i}} \right) * 0.5 \quad (4)$$

where $v_i$ denotes the volume fraction for the $i^{th}$ mineral, $C_i$ is its stiffness tensor, and $C_M$ is the stiffness tensor of the mixed minerals.

Formulation Using Differential Effective Medium (DEM) Theory

Nishizawa (1982) showed how to calculate the effective elastic stiffness tensor for a solid embedded with parallel pores. In the present invention, Nishizawa's theory is extended to the case where the pores may have a preferred orientation distribution, and the differential equations are formulated according to the approach suggested by Hornby et al. (1994). Following Xu et al. (2006), one gets $$\frac{dA}{d\phi} = \frac{1}{1-\phi} \sum_\alpha \int_0^{\pi/2} \int_0^{2\pi} F_\alpha(\theta, \varphi) H_\alpha(\theta, \varphi) A d\varphi d\theta = \frac{1}{1-\phi} PA \quad (5)$$

where $$P = \sum_\alpha \int_0^{\pi/2} \int_0^{2\pi} F_\alpha(\theta, \varphi) H_\alpha(\theta, \varphi) d\varphi d\theta$$

and $$\int_0^{\pi/2} \int_0^{2\pi} F_\alpha(\theta, \varphi) d\varphi d\theta = \frac{\phi_\alpha}{\phi_T}.$$

$\alpha_i$ is the aspect ratio of pore type i, with a porosity of $\phi_\alpha$. $\theta$ and $\phi$ are polar angle and azimuth, respectively. A is the compliance tensor of the effective medium and $\phi$ is porosity. $F_\alpha(\theta,\phi)$ is the probability density function for the orientation distribution for each pore type. Using an example mentioned before, the model is assumed to have five pore types (inter-particle porosity, clay-related pores, equant pores, microcracks and fractures). Other quantities above are $$H_\alpha(\theta,\phi)_{ijkl} = T_{ijklmnpq} Q(\alpha)_{mnpq} \quad (6)$$

and finally, $$T_{ijklmnpq} = K_{im} K_{jn} K_{kp} K_{lq} \quad (7)$$

$$K = \begin{bmatrix} \cos(\theta)\cos(\varphi) - \sin(\varphi)\sin(\theta)\cos(\varphi) \\ \cos(\theta)\sin(\varphi)\cos(\varphi)\sin(\theta)\sin(\varphi) \\ -\sin(\theta)0\cos(\theta) \end{bmatrix} \quad (8)$$

$$Q(\alpha) = [(C - C^I)S(\alpha) - C]^{-1}[C^I - C]. \quad (9)$$

Tensor Q is calculated in the local coordinate system, where its z-axis is chosen parallel to the symmetry axis of the inclusion. Here C and $C^I$ are the elastic stiffness tensors of the solid and fluid phases, respectively. S is the Eshelby (1957) tensor, which is a function of the pore shape (aspect ratio). As shown later, S can be calculated using equations given by Eshelby (1957) when the background solid is isotropic and using equations given by Mura (1987) when the background solid is transversely isotropic.

In differential effective medium theory, equation (5) has to be solved iteratively (numerically). The number of iterations depends on porosity and the pore aspect ratios. Typically, different pore types are added to the system sequentially using equation (5). The DEM theory implemented in this way makes the final effective properties asymmetric, i.e., the final effective elastic constants depend upon the order in which the pores are added. A new scheme proposed by Xu et al. (2006) may be followed to address the issue. In this scheme, a small portion of all pore types is added into the system proportionally at each iteration.

Formulation Using Anisotropic Thy Rock Approximation (ADA) Method

The differential effective medium theory described above gives reasonably accurate result but it is computationally expensive. In order to improve the efficiency of the method, the present inventive method extends the dry rock approximation method developed by Keys and Xu (2002) to the anisotropic case (PCT Patent Application Publication WO/2006/062612). For dry rock, $C^I=0$, and the 4th order tensor Q in Equation (9) can be written as, $$Q(a) = [S(\alpha) - I]^{-1} \quad (10)$$

Here, I is the identity tensor. The key idea is that the S tensor is approximately independent of porosity in a dry rock and, therefore, remains constant. In this case, the differential equation (5) can be solved analytically, $$A = (1-\phi)^P A_0 \quad (11)$$

where $A_0$ is the compliance tensor of the solid matrix. Note that P is a fourth-order tensor rather than a scalar. The anisotropic dry rock approximation dramatically increases the calculation speed.

The compliance tensor $A(\phi)$ in Equation (11) is the anisotropic dry rock approximation. The tensor $(1\phi)^P$ in Equation (11) can be defined by the power series expansion:

$$(1-\phi)^P = e^{\log(1-\phi)P} = \sum_{k=0}^{\infty} \frac{(\log(1-\phi))^k}{k!} P^k \quad (12)$$

The tensor P in Equation (12) is isomorphic to a 9×9 matrix. That is, there is a one-to-one transformation from the space of tensors of rank four onto the space of 9×9 matrices that preserves multiplication and addition. Consequently, the tensor P in Equation (12) can be replaced by a 9×9 matrix P, so that the power series in (12) is defined by ordinary matrix operations.

Fluid Communication and Gassmann Fluid Substitution

The differential effective medium (DEM) theory or the Anisotropic Dry Rock Approximation (ADRA) described above may then be used to add the pore space into the system. Special attention is preferably paid to the fluid communication issue. With the theoretical framework, the present inventive method is able to simulate elastic properties of the composite with relaxed (all the pore fluid are communicating), unrelaxed (no fluid communication, i.e. isolated pores), or partially relaxed pore fluids. Which pore fluid is communicating and which is not depends on many factors such as pore size, pore connectivity (local permeability), fluid viscosity and frequency.

Because of the extremely small sizes of clay-related pores and, possibly, microcracks (e.g., cracks less than 1 micron), it may be assumed that these pores are practically isolated and therefore give a high-frequency response even at seismic frequencies. Fluids in other pores (inter-particle, equant pores and fractures) are able to communicate, giving a low-frequency response.

One embodiment of the present invention employs a four-step procedure to implement certain concepts (see FIG. 4). First, the effective compliance tensor ($A_0$) is calculated for the solid with water-wet micro pores (clay pores and microcracks) only (step 44). Second (step 45), the effective compliance tensor ($A_{Dry}$) is calculated for the solid with all the pores (water-wet for clay pores and microcracks and dry for inter-particle, equant pores and fractures). Third, the effective water saturation and the effective fluid properties are calculated for the dry pores using the following equations (step 46):

$$S_W^{Effective} = \frac{S_W^{Total} \phi_T - \phi_{Clay} - \phi_{MC}}{\phi_{Effective}} \quad (13)$$

where $W_S^{Total}$ is the total water saturation, is the effective water saturation, and $\Phi_{Effective}$ is the effective porosity;

$$\Phi_{Effective} = \Phi_T - \Phi_{Clay} - \Phi_{MC} \quad (14)$$

A mixing law, e.g. the Wood suspension model, may be used to calculate the compressibility ($C_f$) of the pore fluid mixture:

$$C_f = S_W^{Effective} * C_{Brine} + (1 - S_W^{Effective}) * C_{Hydrocarbon} \quad (15)$$

where $C_{Brine}$ and $C_{Hydrocarbon}$ are compressibilities of brine and hydrocarbon (oil or gas), respectively.

Finally the Brown-Korringa (1975) equation is used to do anisotropic fluid substitution using the elastic compliance tensors calculated above (step 47), $$A_{ijkl}^{dry} - A_{ijkl}^{sat} = \frac{(A_{ijmm}^{dry} - A_{ijmm}^0)(A_{klmm}^{dry} - A_{klmm}^0)}{(C_{dry} - C_0) + (C_f - C_0)\phi_{Effective}} \quad (16)$$

Here $C_{dry}$, $C_0$ and $C_f$ are compressibilities of the dry rock frame, solid and fluid mixture, respectively. Following the convention used by Brown and Korringa (1975), $A_{ijmm}$ indicates summation over the last two indices.

$$A_{ijmm} = A_{ij} = \sum_{m=1}^{3}\sum_{n=1}^{3} A_{ijmn} \quad (17)$$

Upscaling/Log Blocking

For the purpose of synthetic seismic forward modeling (synthetic seismogram generation), sonic logs are overly sampled; sampling intervals of the sonic logs are usually much smaller (e.g., 0.5 ft) than the seismic wavelength (e.g., 200 ft). Synthetic seismic modeling performed on the original sampled sonic logs is computationally expensive and unnecessary. Log blocking/upscaling is commonly carried out to "up-sample" the sonic logs to allow for realistic computation of synthetic seismogram generation. Special treatment of sonic log blocking/upscaling is a feature of the present invention. Traditionally, Backus Averaging [Backus 1962] is used to block sonic logs. The method has worked well in clastic rocks where azimuthal anisotropy can be ignored. However, the method is not valid in cases where there are aligned vertical fractures, which often cause strong azimuthal anisotropy. In some embodiments of the present inventive method, Backus Averaging is extended, using the equations set forth below, to the orthorhombic case where each layer can be isotropic, vertically transversely isotropic (VTI), horizontally transversely isotropic (HTI) or orthorhombic.

$$C_{11}^* = \left\langle \frac{C_{13}}{C_{33}} \right\rangle^2 \left\langle \frac{1}{C_{33}} \right\rangle^{-1} + \left\langle C_{11} - \frac{C_{13}^2}{C_{33}} \right\rangle \quad (18)$$

$$C_{22}^* = \left\langle \frac{C_{23}}{C_{33}} \right\rangle^2 \left\langle \frac{1}{C_{33}} \right\rangle^{-1} + \left\langle C_{22} - \frac{C_{23}^2}{C_{33}} \right\rangle \quad (19)$$

$$C_{12}^* = \left\langle \frac{C_{13}}{C_{33}} \right\rangle \left\langle \frac{C_{23}}{C_{33}} \right\rangle \left\langle \frac{1}{C_{33}} \right\rangle^{-1} + \left\langle C_{12} - \frac{C_{13}C_{23}}{C_{33}} \right\rangle \quad (20)$$

$$C_{13}^* = \left\langle \frac{C_{13}}{C_{33}} \right\rangle \left\langle \frac{1}{C_{33}} \right\rangle^{-1} \quad (21)$$

$$C_{23}^* = \left\langle \frac{C_{23}}{C_{33}} \right\rangle \left\langle \frac{1}{C_{33}} \right\rangle^{-1} \quad (22)$$

$$C_{33}^* = \left\langle \frac{1}{C_{33}} \right\rangle^{-1} \quad (23)$$

$$C_{44}^* = \left\langle \frac{1}{C_{44}} \right\rangle^{-1} \quad (24)$$

$$C_{55}^* = \left\langle \frac{1}{C_{55}} \right\rangle^{-1} \quad (25)$$

$$C_{66}^* = \langle C_{66} \rangle \quad (26)$$

Here, $C_{ij}$ are the elastic constants of each individual layer and $C_{ij}^*$ are the effective elastic constants of the equivalent medium. $\langle \rangle$ denotes thickness-weighted arithmetic averaging.

The preceding approach is one embodiment of the invention; it handles one vertically aligned fracture set or two orthogonally intersected fracture sets. In more general cases where two or more fracture sets intersect at arbitrary angles, a method such as that given by Schoenberg and Muir, (1989) may be used.

Checkshot Calibration

Checkshot calibration in an anisotropic media is tricky. Traditionally, checkshot data are applied to modify a velocity (P-wave or S-wave) log only. This traditional approach does not maintain the internal consistency of the elastic constants in the cases of anisotropic media. In those embodiments of the invention using checkshot calibration, i.e. calibration with checkshot data, a four-step approach is preferred to maintain internal consistency:

1. Calculate P- or S-wave velocity ($V_{Model}$) in each layer after upscaling in the direction of checkshot seismic-wave path using equations 68-72.

2. Calculate P- or S-wave velocity ($V_{CheckShot}$) in each layer from the checkshot data.

3. Find a scaling factor for P- or S-wave velocity for each layer in the direction of the calibration:

$$\eta = \frac{V_{CheckShot}}{V_{Model}} \quad (27)$$

Where $V_{Model}$ is the P- or S-wave velocity of the layered model in the direction of calibration and $V_{CheckShot}$ is the P- or S-wave velocity derived from the checkshot data for the same layer.

4. Apply the scaling factor to correct the stiffness tensor for each layer $$C_{ijkl}^{Corrected} = \eta^2 \cdot C_{ijkl}^* \quad (28)$$

The approach allows the relationships among the elastic constants ($C_{ijkl}$) to be maintained.

Calculation of the Eshelby Tensor

The Eshelby tensor $S_{ijkl}$ describes the pore geometry effect on the overall effective elastic properties of the porous rock. This is an important parameter which controls the porosity-velocity relationship and, especially, anisotropy. Adding a particular pore into the system means modifying the effective properties of the porous composite in terms of the Eshelby tensor (step 42 in FIG. 4). A key step for the differential effective medium theory or the anisotropic dry rock approximation is the calculation of the S tensor. For example, Mura (1987) has shown how to calculate the Eshelby tensor $S_{ijkl}$ for a pore embedded in a solid with hexagonal symmetry.

$$S_{ijkl} = \frac{1}{8\pi}(G_{ipjq} + G_{jpiq})C_{pqkl} \quad (29)$$

where C is the stiffness tensor of the solid. G is a fourth-rank geometry tensor which depends on the pore shape and the elastic properties of the solid. For an oblate spheroidal pore with aspect ratio $\alpha = c/a$, Mura (1987) claims that there are twelve non-zero elements for $G_{ijkl}$, which can be calculated using the following integrals.

$$G_{1111} = \frac{\pi}{2}\int_0^1 (1-x^2)[(f(1-x^2)+h\rho^2 x^2)((3e+d)+4f\rho^2 x^2) - g^2\rho^2(1-x^2)x^2]\Delta\, dx \quad (30)$$

-continued $$G_{2222} = G_{1111} \quad (31)$$

$$G_{3333} = 4\pi\int_0^1 x^2\rho^2(d(1-x^2)+f\rho^2 x^2)(e(1-x^2)+f\rho^2 x^2)\Delta\, dx \quad (32)$$

$$G_{1122} = \quad (33)$$
$$\frac{\pi}{2}\int_0^1 (1-x^2)[(f(1-x^2)+h\rho^2 x^2)((e+3d)(1-x^2)+4f\rho^2 x^2) - 3g^2\rho^2(1-x^2)x^2]\Delta\, dx$$

$$G_{2211} = G_{1122} \quad (34)$$

$$G_{1133} = \quad (35)$$
$$2\pi\int_0^1 x^2\rho^2[((d+e)(1-x^2)+2f\rho^2 x^2)(f(1-x^2)+h\rho^2 x^2) - g^2\rho^2(1-x^2)x^2]\Delta\, dx$$

$$G_{2233} = G_{1133} \quad (36)$$

$$G_{3311} = 2\pi\int_0^1 (1-x^2)(d(1-x^2)+f\rho^2 x^2)(e(1-x^2)+f\rho^2 x^2)\Delta\, dx \quad (37)$$

$$G_{3322} = G_{3311} \quad (38)$$

$$G_{331} = \frac{\pi}{2}\int_0^1 (1-x^2)^2[g^2 x^2\rho^2 - (d-e)(f(1-x^2)+h\rho^2 x^2)]\Delta\, dx \quad (39)$$

$$G_{1313} = -2\pi\int_0^1 (1-x^2)x^2\rho^2(e(1-x^2)+f\rho^2 x^2)\Delta\, dx \quad (40)$$

$$G_{2323} = G_{1313} \quad (41)$$

where $$\Delta = \{[e(1-x^2)+f\rho^2 x^2][(d(1-x^2)+f\rho^2 x^2)(f(1-x^2)+h\rho^2 x^2) - g^2\rho^2(1-x^2)x^2]\}^{-1}$$

$d = C_{1111}$ $e = (C_{1111} - C_{1122})/2$ $f = C_{2323}$ $g = C_{1133} + C_{2323}$ $h = C_{3333}$ $$\rho = 1/\alpha \quad (42)$$

It must be pointed out that we have proved that $G_{ijkl}$ actually has 21, instead of 12, non-zero elements because $G_{ijkl}$ has the following symmetry:

$$G_{ijkl} = G_{jikl} = G_{ijlk} = G_{jilk} \quad (43)$$

The 9 missing non-zero elements are: $G_{2121}$, $G_{1221}$, $G_{2112}$, $G_{3131}$, $G_{1331}$, $G_{3113}$, $G_{3232}$, $G_{2332}$, $G_{2332}$ with $$G_{2121} = G_{1221} = G_{2112} = G_{1212} \quad (44)$$

$$G_{3131} = G_{1331} = G_{3113} = G_{1313} \quad (45)$$

$$G_{3232} = G_{2332} = G_{3223} = G_{2323} \quad (46)$$

Equations 29 to 46 are valid for calculating the geometrical properties of an inclusion in a transversely isotropic (TI) medium. Since the integrals have to be done numerically, it can be extremely time-consuming to calculate $S_{ijkl}$, especially when aspect ratios are small, e.g. less than $10^{-3}$. Since the anisotropic dry rock approximation has analytical solution, $S_{ijkl}$ does not have to be updated and, hence, can be calculated using Eshelby's equations for the isotropic matrix (Eshelby 1957), $$S_{1111} = \frac{3R}{Q}\left(\pi - \frac{P}{4}\right)I1 \quad (47)$$

$$S_{2222} = S_{1111} \quad (48)$$

$$S_{3333} = \frac{4\pi - 2\alpha^2 P}{Q} + R \cdot I1 \quad (49)$$

$$S_{1122} \frac{(\pi - P/4)}{Q} - R \cdot I1 \quad (50)$$

$$S_{2211} = S_{1122} \quad (51)$$

$$S_{1133} = \frac{\alpha^2 P}{Q} - R \cdot I1 \quad (52)$$

$$S_{2233} = S_{1133} \quad (53)$$

$$S_{3311} = \frac{P}{Q} - R \cdot I3 \quad (54)$$

$$S_{3322} = S_{3311} \quad (55)$$

$$S_{2323} = \frac{(1+\alpha^2)P}{2Q} + \frac{R(I1 + I3)}{2} \quad (56)$$

$$S_{1313} = S_{2323} \quad (57)$$

$$S_{1212} = \frac{(\pi - P/4)}{Q} + R \cdot I1 \quad (58)$$

Again, the Eshelby S tensor has the symmetry $S_{ijkl}=S_{jikl}=S_{ijlk}=S_{jilk}$ and therefore it follows that $$S_{2121}=S_{1221}=S_{2112}=S_{1212} \quad (59)$$

$$S_{3131}=S_{1331}=S_{3113}=S_{1313} \quad (60)$$

$$S_{3232}=S_{2332}=S_{3223}=S_{2323} \quad (61)$$

where $$I1 = \frac{2\pi\alpha(\alpha\cos(\alpha) - \alpha\sqrt{1-\alpha^2})}{(1-\alpha^2)^{\frac{3}{2}}} \quad (62)$$

$$I3 = 4\pi - 2I1 \quad (63)$$

$$Q = 8\pi(1-\nu) \quad (64)$$

$$R = \frac{(1-2\nu)}{Q} \quad (65)$$

$$P = \frac{I3 - I2}{1 - \alpha^2} \quad (66)$$

And finally $\nu$ is Poisson's ratio which can be calculated using the following equation $$\nu = \frac{\lambda}{2(\lambda + \mu)} \quad (67)$$

Here $\lambda$ and $\mu$ are lame constants for an isotropic solid.

Calculate P- and S-Wave Slowness at an Arbitrary Angle.

The invention tries to minimize the difference between the calculated P-wave slowness along the wellbore and the measured P-wave log to invert porosity or other parameters. Full elastic constants $C_{ijkl}$ are calculated using the rock physics model for the given porosity, shale volume and water saturation, in addition to other parameters. Then the P-wave slowness in the direction of the wellbore will be calculated. In the case of a transversely isotropic (TI) medium, for example, there are five independent elastic constants. P-, SV- and SH-wave phase velocities can be calculated using the following equations (Thomsen 1986).

$$\rho V_P^2 = \frac{1}{2}[C_{33} + C_{44} + (C_{11} - C_{33})\sin^2\theta + D(\theta)], \quad (68)$$

$$\rho V_{SV}^2 = \frac{1}{2}[C_{33} + C_{44} + (C_{11} - C_{33})\sin^2\theta - D(\theta)], \quad (69)$$

and $$\rho V_{SH}^2 = C_{66}\sin^2\theta + C_{44}\cos^2\theta, \quad (70)$$

where $$D(\theta) = \left\{\begin{array}{c}(C_{33} - C_{44})^2 + 2[2(C_{13} + C_{44})^2 - (C_{33} - C_{44})]\sin^2\theta \\ [(C_{11} + C_{33} - 2C_{44})^2 - 4(C_{13} + C_{44})^2]\sin^4\theta\end{array}\right\}^{\frac{1}{2}}, \quad (71)$$

$\theta$ is the angle between the symmetry axis of the TI medium and the wave propagation direction. In the case of a VTI medium, $\theta$ is the polar angle. The group velocity ($V_{Group}$) for a particular wave (P, SV or SH) can be calculated from its phase velocity ($V_{Phase}$) using the following equation (Berryman 1979).

$$V_{Group}^2(\phi(\theta)) = V_{Phase}^2(\theta) + \left(\frac{dV_{Phase}}{d\theta}\right)^2. \quad (72)$$

Here $\phi$ is the group angle which is determined by the following equation.

$$\tan(\phi(\theta)) = \frac{\left(\tan(\theta) + \frac{1}{V_{Phase}}\frac{dV_{Phase}}{d\theta}\right)}{\left(1 - \frac{\tan(\theta)}{V_{Phase}}\frac{dV_{Phase}}{d\theta}\right)} \quad (73)$$

Finally the slowness (DT) of the wave is just the inverse of its velocity, $$DT = 1/V_{Group} \quad (74)$$

A standard inversion method is used to invert porosity by minimizing the error between the calculated P-wave slowness (DT), as shown above, and the measured P-wave log at each depth.

EXAMPLES

The integrated workflow and the rock physics model of the present invention were used to study the effect of fractures on seismic response at an East Texas well. Two examples showing that the present invention generates suitable elastic constants are presented here. In the first example, a single fracture set is assumed, aligned perpendicular to the x-axis, in a mixed carbonate-clastic environment (see track 71 of FIG. 7, where the shale volume fraction varies greatly with depth). The fracture porosity (track 72) is zero above 3800 ft, where all the calculated anisotropy comes from shale anisotropy. (In tracks 73-75, blue curves are $C_{11}$, red curves are $C_{22}$, and green curves are $C_{33}$.) Thus, $C_{11}$ and $C_{22}$, the two quantities plotted on track 73, are the same above 3800 ft. Below 3800 ft, the anisotropy is HTI in clean limestone and VTI in pure shale, and orthorhombic in shaly (muddy) carbonate with vertical fractures. Azimual anisotropy is indicated by the difference between $C_{11}$ and $C_{22}$ in track 73. Very strong azimuthal anisotropy can be seen in a clean limestone layer just below 4000 ft as seen from the large differences between $C_{11}$ and $C_{22}$ (track 73) and that between $C_{11}$ and $C_{33}$ (track 74). Note the nearly identical $C_{22}$ and $C_{33}$ (track 75) in the clean limestone zones, indicating a HTI symmetry.

Figure 7:
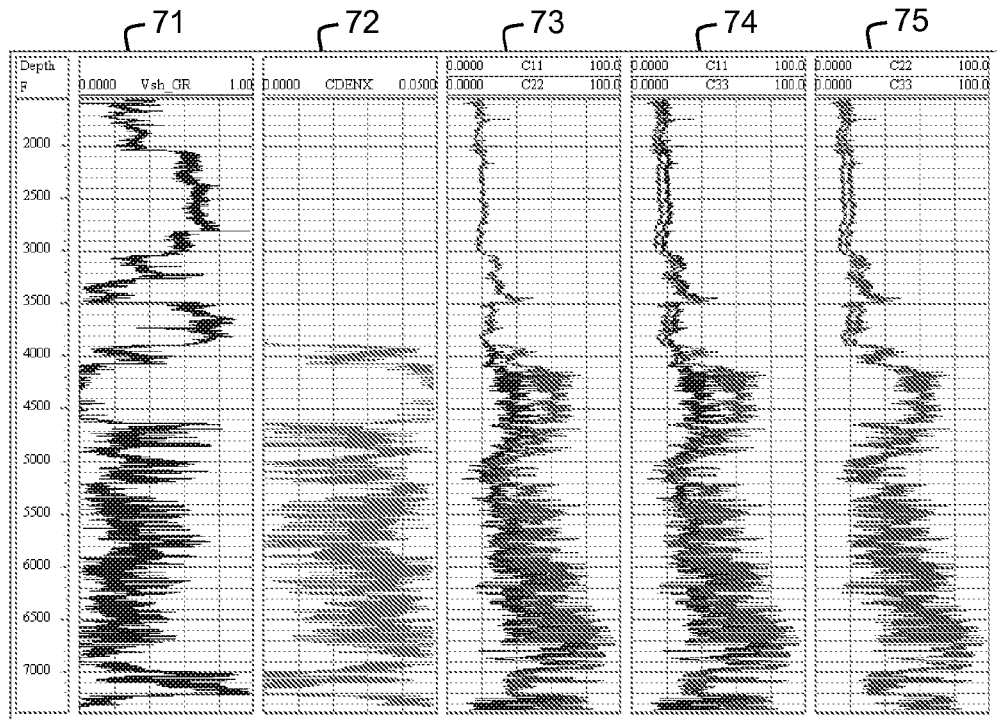
FIG. 7 illustrates a single fracture set, aligned perpendicular to the x-axis, in a mixed carbonate-clastic environment.
Figure 8:
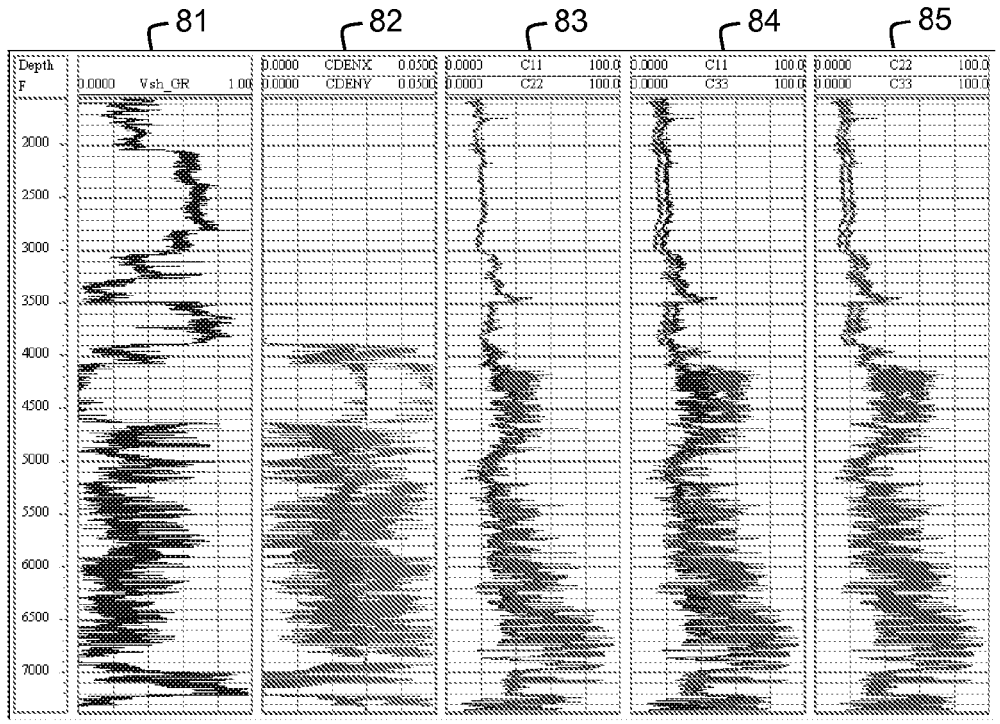
FIG. 8 illustrates two fracture sets, one aligned perpendicular to the x-axis and the other perpendicular to the y-axis, in a mixed carbonate-clastic environment.

A second example (FIG. 8) has two fracture sets, a first set aligned perpendicular to the x-axis (the same fracture set as in FIG. 7) and the other perpendicular to y-axis, in the same mixed carbonate-clastic environment (Track 81 in FIG. 8 is the same as track 71 in FIG. 7). The fracture porosity for the first fracture set (magenta curves) is twice as great as that for the second fracture set (brown curves), in track 82. Again, there is no fracture above the depth of 3800 ft where all the anisotropy comes from shale anisotropy ($C_{11}$ is equal to $C_{22}$ in track 83). In tracks 83-85, blue curves are $C_{11}$, red curves are $C_{22}$, and green curves are $C_{33}$. Below 3800 ft, the anisotropy is VTI in pure shale and orthorhombic symmetry in muddy or clean carbonate. In particular, it can be noted that the azimuthal anisotropy (tracks 83 and 84) in the clean limestone layer just below 4000 ft is much weaker than that for the single fracture case. In this particular case, large differences can also be seen between $C_{22}$ and $C_{33}$ (track 85), indicating that the fractured rock has an orthorhombic symmetry. This indicates that it is more difficult or impossible to detect fractures using seismic anisotropy in a multiple fracture system.

Figure 9:
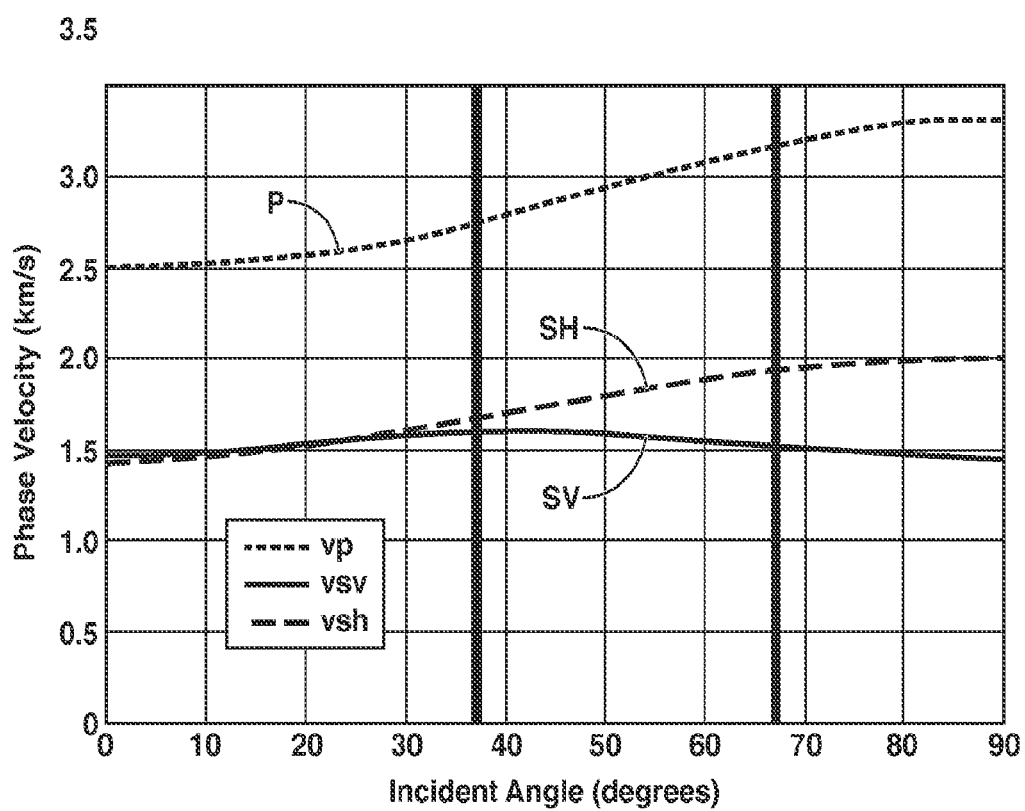
FIG. 9 illustrates P-, SV- and SH-wave velocities as a function of incident (deviation) angles.
Figure 10:
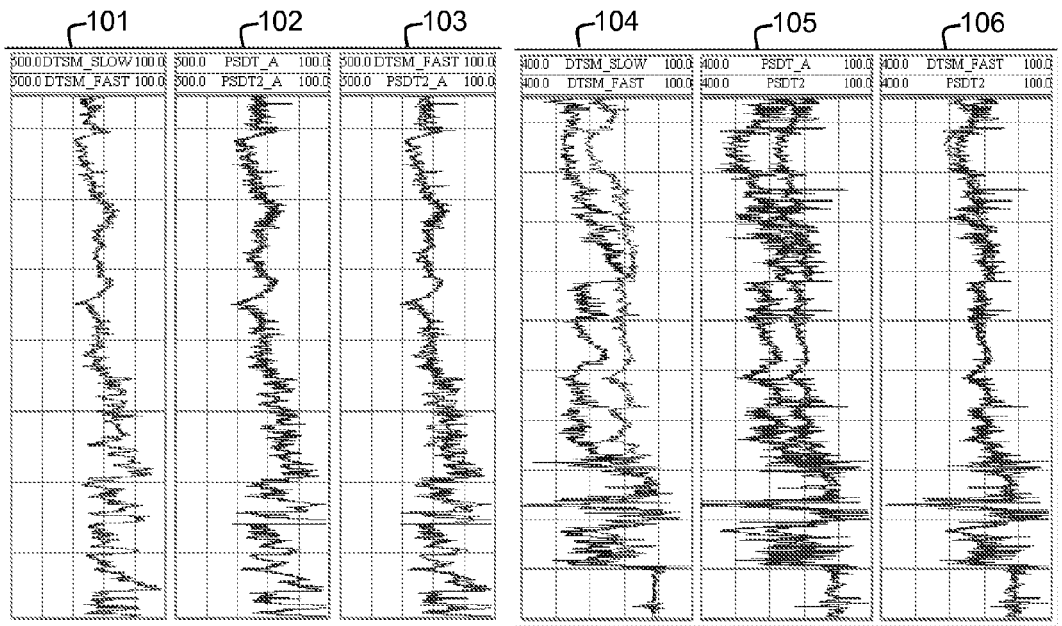
FIG. 10 compares well log shear-wave splitting (the difference between the fast and slow S-wave logs) and that calculated using our rock physics model at two North Sea wells.

A North Sea example is given to demonstrate how the anisotropy parameter estimation method at deviated wells works in practice (FIGS. 9 and 10). In this case, there are two deviated wells: Well "A" with deviation angles about 35 degrees and Well "B" with deviation angles about 65 degrees (FIG. 9). FIG. 9 shows three curves of modeled results for P- and S-wave velocities vs. well deviation angle. Curve P represents the P-wave velocity, curve SH represents the horizontal S-wave velocity, and curve SV represents the vertical S-wave velocity. Since the example is basically a sand-shale system, rock properties can be modeled using a VTI (transverse isotropy with a vertical symmetry axis) system (Xu, Saltzer and Keys 2006). As mentioned earlier, shear-wave splitting (the separation between SH- and SV-wave logs) is controlled by anisotropy parameters. If the anisotropic rock physics correctly predicts the anisotropy parameters, the calculated fast and slow S-wave logs should match the measured reasonably well.

FIG. 10 shows the results (left three tracks for Well "A", and right three tracks for Well "B"). The blue and red curves in track 101 are the measured Well "A" cross-dipole slow (typically, but not always, the SV wave) and fast (typically, but not always, the SH wave) shear-wave logs, respectively. Their separation is an indicator of shear-wave splitting, which is controlled by anisotropy parameters and the well deviation angle. At 35 degrees (Well "A"), their separation is small. This does not mean weak anisotropy at the well, but rather the deviation angle is not high enough to see the anisotropy. The huge separation between the measured slow (blue) and fast (red) S-wave logs at Well "B" (Track 104) indicates very strong shale anisotropy in the region. The green and brown curves in Tracks 102 and 105 are the corresponding S-wave logs calculated using the present invention's anisotropic rock physics model. The calculation results agree with the measurements very well: small shear-wave splitting at Well "A", but large shear-wave splitting at Well "B", indicating the predictive power of the rock physics model.

It should be kept in mind that (as shown in FIG. 9) the Vp–Vs relationship is also affected by anisotropy parameters, in addition to lithology and fluid content. In other words, Vp/Vs varies with deviation angles. Since S-wave logs are predicted from P-wave logs using the rock physics model, the goodness of fit between measured (red) and calculated (brown) fast S-wave logs (Tracks 103 and 106) can also be used to validate the anisotropic rock physics model.

Figure 11:
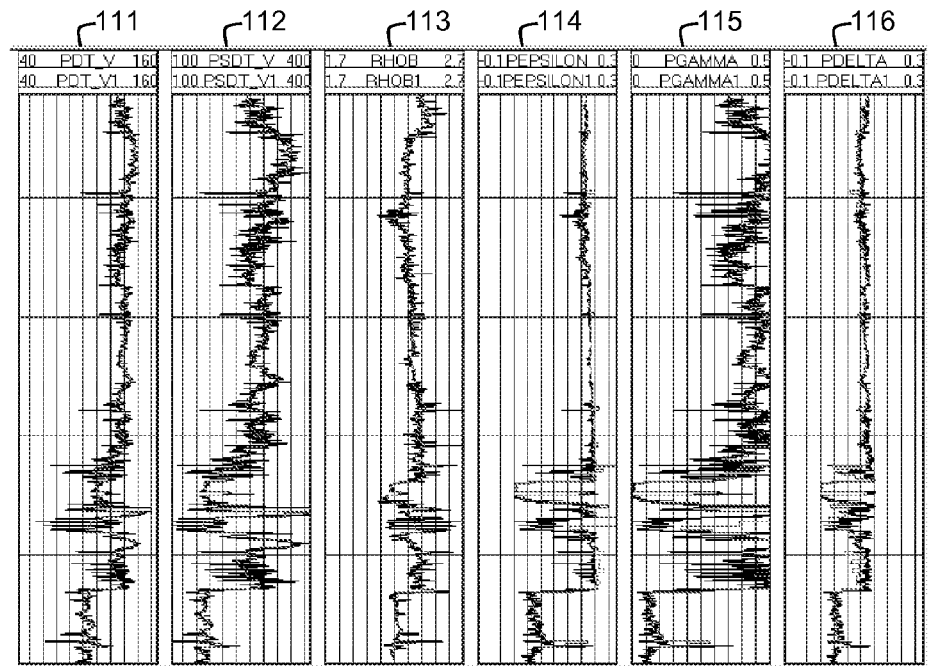
FIG. 11 illustrates the upscaling results in VTI layered media using Backus Averaging.

Upscaling is an important part of a typical workflow. A theoretical model is needed to maintain internal consistency. In the case of a sand-shale system, the rocks are either isotropic (clean sands) or VTI (shale and shaly sands). Backus (1962) averaging is selected in this example to block the logs. FIG. 11 shows vertical P- (Track 111), vertical S-wave (Track 112), density (Track 113) logs and the calculated $\epsilon$ (Track 114), $\gamma$ (Track 115) and $\delta$ (Track 116) before (black curves) and after (red curves) upscaling. Note that P- and S-wave logs have been corrected for the anisotropy effect and converted to the vertical direction using the calculated anisotropy parameters. Much stronger anisotropy can be observed after upscaling over a small depth interval where thin layers of sand and shale exist.

Figure 12:
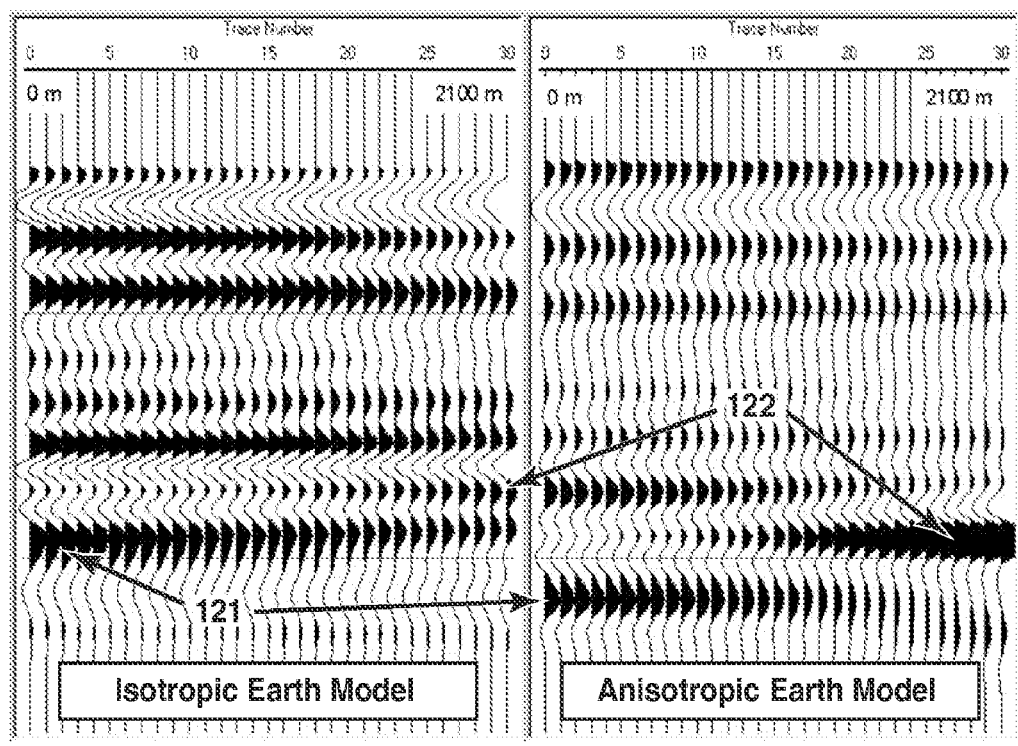
FIG. 12 illustrates the effect of sonic log correction and anisotropy on AVO response using data from FIG. 11.

FIG. 12 shows synthetic gathers generated from well logs illustrated in FIG. 11 to demonstrate the effect of anisotropy on AVO response. The synthetic gather on the left was generated from an isotropic earth model, which was constructed using measured P-, slow S-wave and density logs. The synthetic gather on the right was generated from the anisotropic earth model which was constructed from full elastic tensors (honoring both P- and S-wave logs). The two synthetic gathers were aligned to the top of the logs. First, the anisotropy effect on travel time can be observed; see, for example, reflection event 121 as depicted in each gather. Since the measured P-wave log is considerably faster along the wellbore direction than that in the vertical direction, the deep reflections from isotropic model arrive earlier than those from anisotropic earth model. (The vertical scale is travel time, increasing in the downward direction.) Secondly, the AVO behavior is very different. There is a strong AVO anomaly from the deep section of the anisotropic earth model, which is missing from the isotropic earth model, indicating a strong effect of anisotropy on AVO modeling; see, for example, reflection event 122. (AVO means amplitude variation with offset (source-receiver separation), with offset being represented by the trace number on the horizontal scale.)

The foregoing application is directed to particular embodiments of the present invention for the purpose of illustrating it. It will be apparent, however, to one skilled in the art, that many modifications and variations to the embodiments described herein are possible. All such modifications and variations are intended to be within the scope of the present invention, as defined in the appended claims. Persons skilled in the art will readily recognize that in preferred embodiments of the invention, at least some of the steps in the present inventive method are performed on a computer, i.e. the invention is computer implemented. In such cases, the resulting models with input parameters may either be downloaded or saved to computer storage.

REFERENCES

Backus, G. E., "Long-wave elastic anisotropy produced by horizontal layering," *Journal of Geophysical Research* 67, 4427-4440 (1962).

Berryman, J. G., "Long-wave elastic anisotropy in transversely isotropic media", *Geophysics,* 44, 896-917 (1979).

Brown, R. J. S., and Korringa, "On the dependence of the elastic properties of a porous rock on the compressibility of the pore fluid," *Geophysics* 40, 608-616 (1975).

Eshelby, J. D., "The determination of the elastic field of an ellipsoidal inclusion, and related problems," *Proceedings of Royal Society of London, Series A*, 241, 376-396 (1957).

Hornby, B. E., Schwartz, L. M. and Hudson, J. A., "Anisotropic effective-medium modeling of the elastic properties of shales," *Geophysics* 59, 1570-1583 (1994).

Hornby, B. E., Howie, J. M., and Ince, D. W., "Anisotropy correction for deviated-well sonic logs: Application to seismic well tie", *Geophysics,* 68, 464-471 (2003).

Keys, R. G. and Xu, S., "An approximation for the Xu-White velocity model," *Geophysics* 67, 1406-1414 (2002).

Mura, T., *Micromechanics of defects in solids*, Martinus Nijhoff Publishers, Dordrecht (1987).

Nishizawa, O., "Seismic velocity anisotropy in a medium containing oriented cracks-Transversely isotropic case," *Journal of Physical Earth* 30, 331-347 (1982).

Rathore, et al., "P- and S-wave anisotropy of a synthetic sandstone with controlled crack geometry," *Geophysical Prospecting* 43(6), 711-728, (1995).

Schoenberg, M., and F. Muir, "A calculus for finely layered anisotropic media," *Geophysics* 54, 581-589 (1989).

Thomsen, L., "Elastic anisotropy due to aligned cracks on porous rock," *Geophysical Prospecting* 43, 805-829 (1995).

Thomsen, L., "Weak elastic anisotropy", *Geophysics,* 51, 1954-1966 (1986).

Tsuneyama, F., and Mavko, G., "Velocity anisotropy estimation for brine-saturated sandstone and shale", *The Leading Edge,* 24, 882-888 (2005).

Xu, S. and White, R. E., "A new velocity model for clay-sand mixtures," *Geophysical Prospecting* 43, 91-118 (1995).

Xu, S. and White, R. E., "A physical model for shear-wave velocity prediction," *Geophysical Prospecting* 44, 687-717 (1996).

Xu, S., "Modeling the effect of fluid communication on velocities in anisotropic, porous rocks," *Int. J. Solids Struct*. 35, 4685-4707 (1998).

Xu, S., "Stress-induced anisotropy in unconsolidated sands and its effect on AVO analysis," *72nd Annual International Meeting, SEG, Expanded Abstracts,* 105-108 (2002).

Xu, S., Saltzer, R. L. and Keys, R. G., "Integrated Anisotropic Rock Physics Model," Patent Application Publication Number WO/2006/062612.

The invention claimed is:

1. An analytical method for modeling anisotropic elastic properties of a subsurface region comprising mixed fractured rocks and other geological bodies, in order to predict fluid flow or mass transport or for seismic interpretation in the subsurface region, comprising:

(a) developing an analytical anisotropic micro rock physics model for the subsurface region by an iterative optimization process that compares data from a well log survey or laboratory measurements of core samples from the subsurface region to corresponding data calculated using an assumed anisotropic rock physics model that is updated in the optimization process, wherein the model simulates shale anisotropy via preferred orientations of clay-related pores, fracture anisotropy via alignment of fractures, and stress-induced anisotropy via preferred orientations of microcracks;

(b) calculating an elastic stiffness/compliance tensor, comprising at least three anisotropy parameters, at selected discrete depth intervals using the anisotropic rock physics model;

(c) generating a one-dimensional layered earth model, said 1D earth model being of a coarse scale suitable for simulating elastic and transport properties;

(d) averaging the elastic stiffness/compliance tensor within each layer of the 1D layered earth model using an analytical upscaling theory able to treat at least orthorhombic anisotropy, thereby generating an upscaled anisotropic 1D model of elastic properties of the subsurface region;

(e) generating a synthetic seismic response from the subsurface region using the upscaled anisotropic 1D model; and (f) using the synthetic seismic response for seismic interpretation, or for prediction of fluid flow or of mass transport in the subsurface region.

2. The method of claim 1, further comprising:

(i) obtaining P-wave logs and fast and slow S-wave logs measured in a well bore in the subsurface region;

(ii) calculating P-wave logs and fast and slow S-wave logs traveling in a direction along the well bore from the elastic stiffness/compliance tensor;

(iii) comparing the calculated and measured P-wave logs and fast and slow S-wave logs; and (iv) if the comparison is not within a pre-selected tolerance, adjusting input parameters to the anisotropic rock physics model resulting in a revised anisotropic rock physics model and re-calculating the elastic stiffness/compliance tensor from the revised anisotropic rock physics model, then repeating steps (ii)-(iv) until the tolerance is met or other stopping condition is reached.

3. The method of claim 1, further comprising calibrating the upscaled anisotropic 1D model of elastic properties of the subsurface region using a calibration method capable of handling general anisotropy, and then using the calibrated upscaled anisotropic 1D model when generating the synthetic seismic response.

4. The method of claim 1, further comprising obtaining seismic checkshot data from the subsurface region and using the data to calibrate the upscaled anisotropic 1D model of elastic properties, wherein said calibration maintains relationships among the elastic properties.

5. The method of claim 1, wherein developing the anisotropic rock physics model comprises:

(A) obtaining deviation survey data for a deviated well partly defined by an axis and also obtaining bedding dipping data, and using them to define a relative angle between the well's axis and a direction normal to bedding planes in the subsurface region;

(B) constructing temperature and pressure profiles and using them to estimate fluid properties in the subsurface region;

(C) estimating rock properties of the subsurface region from well logs;

(D) estimating fracture and crack parameters; and (E) using the results of (A)-(D) to develop the anisotropic rock physics model.

6. The method of claim 1, wherein the anisotropic rock physics model includes pore space, and developing the anisotropic rock physics model comprises:

(A) defining pore types and portioning the pore space among the pore types based on interpreted geophysical, geological or field observations;

(B) characterizing shapes of pores, fractures or cracks and their orientation distributions from one or more of petrographic data, borehole imaging logs, and oriented core descriptions;

(C) estimating mineralogy components from well data;

(D) mixing mineralogy components using a solid mixing law;

(E) adding pores with bound water into the model and calculating an effective compliance tensor using an effective medium theory;
(F) adding all pores including pores with bound water and pores without fluid (dry) to the model and calculating an effective compliance tensor using an effective medium theory;
(G) mixing fluids other than bound water using a fluid mixing law; and
(H) adding the fluid mixture from the previous step into the model using anisotropic Gassmann method and the compliance tensors calculated in steps (E) and (F).

7. The method of claim 6, wherein the effective medium theory uses the Eshelby tensor $S_{ijkl}$ to describe a pore geometry effect on effective elastic properties of porous rock in the subsurface region.

8. The method of claim 7, wherein the Eshelby tensor $S_{ijkl}$ for a pore embedded in a solid with hexagonal symmetry is calculated from $$S_{ijkl} = \frac{1}{8\pi}(G_{ipjq} + G_{jpiq})C_{pqkl}$$

where C is the solid's stiffness tensor and G is a fourth-rank geometry tensor that depends on pore shape and elastic properties of the solid, and each index runs from 1 to 3 representing the three dimensions of three-dimensional space.

9. The method of claim 8, wherein pores are assumed to have oblate spheroidal shape and tensor $G_{ijkl}$ has twenty-one non-zero elements.

10. The method of claim 9, wherein nine of the non-zero elements are: $G_{2121}$, $G_{1221}$, $G_{2112}$, $G_{3131}$, $G_{1331}$, $G_{3113}$, $G_{3232}$, $G_{2332}$, $G_{2332}$ with $G_{2121}=G_{1221}=G_{2112}=G_{1212}$ $G_{3131}=G_{1331}=G_{3113}=G_{1313}$ $G_{3232}=G_{2332}=G_{3223}=G_{2323}$.

11. The method of claim 1, wherein the synthetic seismic response is generated using a computer program capable of treating general anisotropy and the synthetic seismic response is used to tie actual seismic data from the subsurface region to well log data from the subsurface region, and then to estimate depth of a potential hydrocarbon bearing formation in the subsurface region.

12. The method of claim 1, wherein the synthetic seismic response is generated using a computer program capable of treating general anisotropy and the synthetic seismic response is used to perform AVO analysis (analyzing variation of seismic amplitude with source-receiver separation) for fluid identification distinguishing hydrocarbons from water in the subsurface region.

13. The method of claim 1, wherein the at least three anisotropy parameters include Thomsen's (1986) anisotropy parameters ($\epsilon$, $\gamma$ and $\delta$).

14. The method of claim 1, wherein the one-dimensional layered earth model is generated using boundaries of geological layers in the subsurface region as interpreted from well log or other information.

15. The method of claim 1, wherein the at least three anisotropy parameters are calculated by steps comprising:
a) obtaining P-wave and cross-dipole (fast and slow) S-wave well log data from a single deviated well in the subsurface region;
b) calculating elastic constants for the subsurface region using an anisotropic rock physics model and quantities estimated from the well log data;
c) estimating three anisotropy parameters from the elastic constants; and
d) optimizing the three anisotropy parameters by minimizing errors between calculated and measured values of P-wave and cross-dipole (fast and slow) S-wave logs, said calculated P-wave and cross-dipole (fast and slow) S-wave logs being calculated using the elastic constants, which are then modified in performing the optimizing.

16. The method of claim 1, wherein predicting fluid flow or mass transport in the subsurface region involves simulating seismic data using the upscaled anisotropic 1D model of elastic properties of the subsurface region.

17. The method of claim 1, wherein the subsurface region comprises a multi-layer system in which fracture layers coexist with non-fracture layers, and the two types of layers have different anisotropy symmetry.

18. A physics-based method for anisotropy parameter or elastic constant estimation from limited well log data in a subsurface region for use in seismic well ties or seismic modeling interpretation, comprising:
a) obtaining P-wave and cross-dipole (fast and slow) S-wave well log data from a single deviated well in the subsurface region;
b) calculating elastic constants for the subsurface region using an analytical anisotropic micro rock physics model and quantities estimated from the well log data;
c) optimizing the elastic constants, or at least one anisotropy parameter calculated from the elastic constants, by minimizing errors between calculated and measured values of P-wave and cross-dipole (fast and slow) S-wave logs, said calculated P-wave and cross-dipole (fast and slow) S-wave logs being calculated using the elastic constants, which are then modified in performing the optimizing; and
d) using the optimized elastic constants or the optimized at least one anisotropy parameter for seismic well ties or seismic modeling interpretation.

19. The method of claim 18, wherein the optimizing further comprises inverting porosity from a P-wave sonic log and estimated shale volume and water saturation curves using an anisotropic rock physics model, in steps comprising:
a) assigning an initial guess of porosity;
b) calculating an elastic stiffness/compliance tensor from the initial porosity, using also other quantities comprising the estimated shale volume and water saturation;
c) calculating P-wave/or S-wave slowness along the single deviated well's wellbore direction from the above calculated stiffness/compliance tensor;
d) comparing the calculated P-wave/S-wave slowness with the measured P-wave/S-wave log and modifying the initial guess of porosity to minimize error between the calculated and the measured sonic logs; and
e) repeating the process until the error is within a given tolerance range.

20. The method of claim 18, further comprising:
(i) using the optimized elastic constants or the optimized at least one anisotropy parameter and a selected upscaling technique to generate an upscaled anisotropic 1D model of elastic properties of the subsurface region;
(ii) using the upscaled anisotropic 1D model of elastic properties of the subsurface region to generate a synthetic seismic response from the subsurface region; and (iii) using the synthetic seismic response for seismic well ties or seismic modeling interpretation in the subsurface region.

21. The method of claim 20, further comprising applying checkshot data to calibrate the upscaled anisotropic 1D model of elastic properties, and then generating the synthetic seismic response; wherein said calibration maintains relationships among the elastic properties.

22. The method of claim 18, wherein the at least one anisotropy parameter is selected from a group consisting of Thomsen's three anisotropy parameters $\epsilon$, $\gamma$ and $\delta$.

23. The method of claim 18, wherein the quantities estimated from the well log data include one or more quantities selected from a list consisting of porosity, shale volume, water saturation, pore aspect ratios, and pore orientation distributions.

24. The method of claim 18, wherein the anisotropic rock physics model is a model capable of handling shale anisotropy, stress-induced anisotropy and fracture anisotropy.

25. The method of claim 18, wherein the elastic constants are calculated from an Eshelby tensor.

26. The method of claim 18, wherein said quantities estimated from the well log data comprise bedding dipping data, and further comprising using the bedding dipping data and the well log data from the deviated well to determine a relative angle between an axis of the deviated well and a direction normal to bedding planes in the subsurface region, and then using said relative angle together with the elastic constants to generate the calculated P-wave and cross-dipole, fast and slow, S-wave logs.

* * * * *